US008817308B2

(12) United States Patent
Tonegawa

(10) Patent No.: US 8,817,308 B2
(45) Date of Patent: Aug. 26, 2014

(54) IMAGE PROCESSING APPARATUS, CONTROL METHOD THEREOF, AND STORAGE MEDIUM

(71) Applicant: Canon Kabushiki Kaisha, Tokyo (JP)

(72) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/767,439

(22) Filed: Feb. 14, 2013

(65) Prior Publication Data

US 2013/0229694 A1 Sep. 5, 2013

(30) Foreign Application Priority Data

Mar. 5, 2012 (JP) ................................ 2012-048609
Dec. 12, 2012 (JP) ................................ 2012-271781

(51) Int. Cl.
*G06F 3/12* (2006.01)

(52) U.S. Cl.
USPC ...................... 358/1.15; 358/426.01; 358/442; 709/206; 709/224; 379/100.17; 379/93.24

(58) Field of Classification Search
CPC ................ H04N 1/00095; H04N 1/00; H04N 2201/0065; H04N 2201/0094; H04N 2201/0015; G06F 15/00; G06F 33/12; G06F 15/173; G06F 15/16; G06K 15/02
USPC ......... 358/1.15, 426.01, 1.16, 442, 402, 1.13, 358/1.9; 709/206, 224, 236, 232; 379/100.17, 93.24, 100.08, 100.01, 379/93.06
See application file for complete search history.

(56) References Cited

U.S. PATENT DOCUMENTS

| | | | |
|---|---|---|---|
| 5,905,783 A | 5/1999 | Tonegawa | 379/100.07 |
| 6,882,448 B2* | 4/2005 | Ishihara | 358/1.9 |
| 6,885,470 B1* | 4/2005 | Toyoda et al. | 358/1.15 |
| 6,952,721 B2 | 10/2005 | Tonegawa | 709/206 |
| 7,119,929 B2* | 10/2006 | Tanimoto | 358/405 |
| 7,142,320 B2* | 11/2006 | Tanimoto | 358/1.15 |
| 7,161,697 B2* | 1/2007 | Yajima | 358/1.15 |
| 7,277,908 B2* | 10/2007 | Clark et al. | 708/650 |
| 7,394,560 B2 | 7/2008 | Tonegawa | 358/1.15 |
| 7,739,118 B2* | 6/2010 | Ueno | 704/277 |
| 7,872,774 B2* | 1/2011 | Okamoto | 358/1.16 |
| 7,982,889 B2* | 7/2011 | Okada | 358/1.14 |
| 8,045,842 B2* | 10/2011 | Terashima | 386/326 |
| 8,115,950 B2* | 2/2012 | Du et al. | 358/1.15 |
| 8,160,550 B2* | 4/2012 | Oh | 455/412.2 |
| 8,189,227 B2* | 5/2012 | Uchida et al. | 358/1.16 |

(Continued)

FOREIGN PATENT DOCUMENTS

| | | |
|---|---|---|
| JP | 2008-257485 A | 10/2008 |
| JP | 2012-049894 A | 3/2012 |

*Primary Examiner* — Negussie Worku

(74) *Attorney, Agent, or Firm* — Fitzpatrick, Cella, Harper & Scinto

(57) ABSTRACT

An image processing apparatus of this invention converts image data into a predetermined transmitting format in turn from a read page before images are read from all pages of originals. Upon completion of reading operations of all the pages of the originals, the image processing apparatus controls a transmitting unit to transmit image data in association with the image data of a page, which has already been converted into the transmitting format, and controls to convert image data into the transmitting format and then controls the transmitting unit to transmit the image data, in association with the image data of a page, which has not been converted into the transmitting format.

21 Claims, 17 Drawing Sheets

(56) References Cited

U.S. PATENT DOCUMENTS

| | | | |
|---|---|---|---|
| 8,195,830 B2 * | 6/2012 | Tian | 709/233 |
| 8,593,674 B2 * | 11/2013 | Tonegawa | 358/1.15 |
| 2004/0005012 A1 * | 1/2004 | Suzuki et al. | 375/262 |
| 2005/0235040 A1 | 10/2005 | Tonegawa | 709/206 |
| 2006/0050303 A1 | 3/2006 | Oomori et al. | 358/1.15 |
| 2007/0236734 A1 * | 10/2007 | Okamoto | 358/1.16 |
| 2013/0021621 A1 * | 1/2013 | Sato | 358/1.6 |

* cited by examiner

F I G. 2
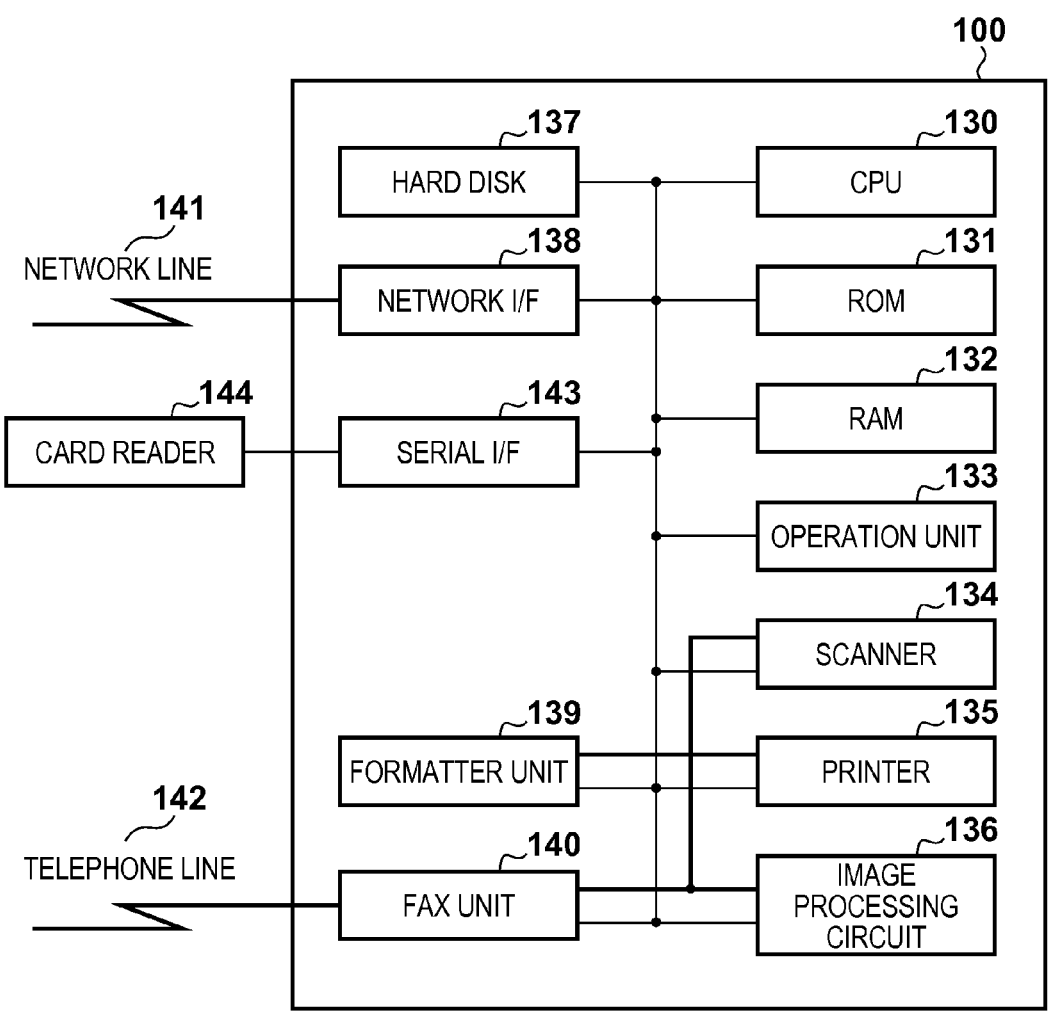

F I G. 14
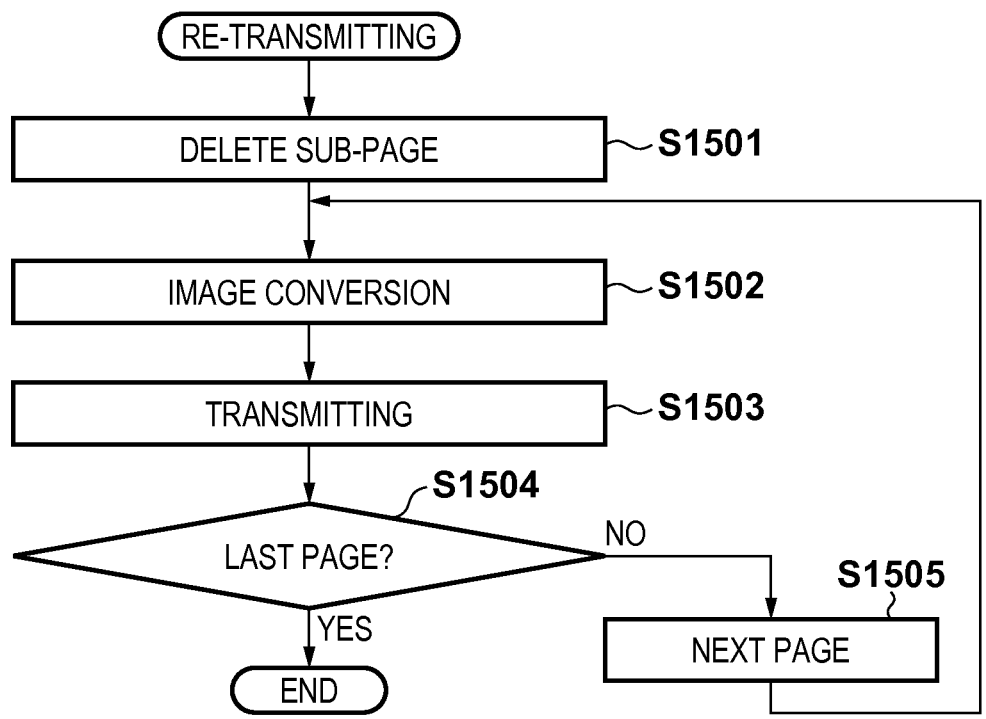

IMAGE PROCESSING APPARATUS, CONTROL METHOD THEREOF, AND STORAGE MEDIUM

BACKGROUND OF THE INVENTION

1. Field of the Invention

The present invention relates to an image processing apparatus which converts an image read by a scanner into a file of a designated image format, and transmits the file to a transmit destination on a network, a control method thereof, and a storage medium.

2. Description of the Related Art

An image processing apparatus such as an MFP (Multi Function Peripheral), which converts an image read by a scanner into a file of a designated image format, and transmits the file to a transmit destination on a network, is available. For example, Japanese Patent Laid-Open No. 2008-257485 has proposed the following technique. That is, with this technique, when it is judged that a transmit destination is a mobile phone, an image read by a scanner is converted to be reduced to a size that can be displayed on an LCD of the mobile phone, and the converted image is transmitted.

Japanese Patent Laid-Open No. 2012-049894 has proposed a technique which starts scanning of an original before information such as a transmit destination required for transmission is input, and transmit an image after the transmit destination and the like which are not input are input.

However, the aforementioned related arts suffer the following problem. Since a plurality of users use the MFP, it is desired to read a document at high speed, and to be yielded to the next user quickly without waiting for completion of data transmission. For this reason, the MFP is mainly designed to speed up the scan processing, but it does not attach any weight on a transmitting speed.

However, some users want to confirm whether or not data could be surely transmitted to a transmit destination. A long transmitting time dissatisfies such users.

SUMMARY OF THE INVENTION

The present invention enables realization of an image processing apparatus, which reduces a waiting time of the user due to image conversion processing by converting a read image into a format to be transmitted to a transmit destination while reading an original by a scanner, a control method thereof, and a storage medium.

One aspect of the present invention provides an image processing apparatus comprising: a reading unit configured to read images from originals including a plurality of pages, and to output image data in turn from a read page; a conversion unit configured to convert the image data of the page output from the reading unit into a predetermined transmitting format; a transmitting unit configured to transmit the image data converted by the conversion unit; and a control unit configured to control the conversion unit to convert the image data into the predetermined transmitting format in turn from the read page until the reading unit has read images from all pages of the originals, to control the transmitting unit to transmit image data in association with the image data of the page in a case where the image data has already been converted into the transmitting format by the conversion unit after the reading unit has been read all the pages of the originals, and to control the conversion unit to convert image data into the transmitting format in association with the image data in a case where the image data has not been converted into the transmitting format yet after the reading unit has been read all the pages of the originals and then to control the transmitting unit to transmit that image data.

Another aspect of the present invention provides a control method of an image processing apparatus, which comprises a reading unit configured to read images from originals including a plurality of pages, and to output image data in turn from a read page, a conversion unit configured to convert the image data of the page output from the reading unit into a predetermined transmitting format, and a transmitting unit configured to transmit the image data converted by the conversion unit, the method comprising: controlling the conversion unit to convert the image data into the predetermined transmitting format in turn from the read page until the reading unit has read images from all pages of the originals, controlling the transmitting unit to transmit image data in association with the image data of the page, in a case where the image data has already been converted into the transmitting format by the conversion unit after the reading unit has been read all the pages of the originals, and controlling the conversion unit to convert image data into the transmitting format in association with the image data in a case where the image data has not been converted into the transmitting format yet after the reading unit has been read all the pages of the originals and then controlling the transmitting unit to transmit that image data.

Still another aspect of the present invention provides a computer-readable storage medium storing a computer program for controlling a computer to execute respective steps in a control method of the image processing apparatus.

Further features of the present invention will be apparent from the following description of exemplary embodiments with reference to the attached drawings.

BRIEF DESCRIPTION OF THE DRAWINGS

FIG. 2 is a block diagram showing the hardware arrangement of an MFP according to the embodiment;

FIG. 14 is a flowchart for explaining the re-transmitting operation according to another embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Processing System>

Figure 1:
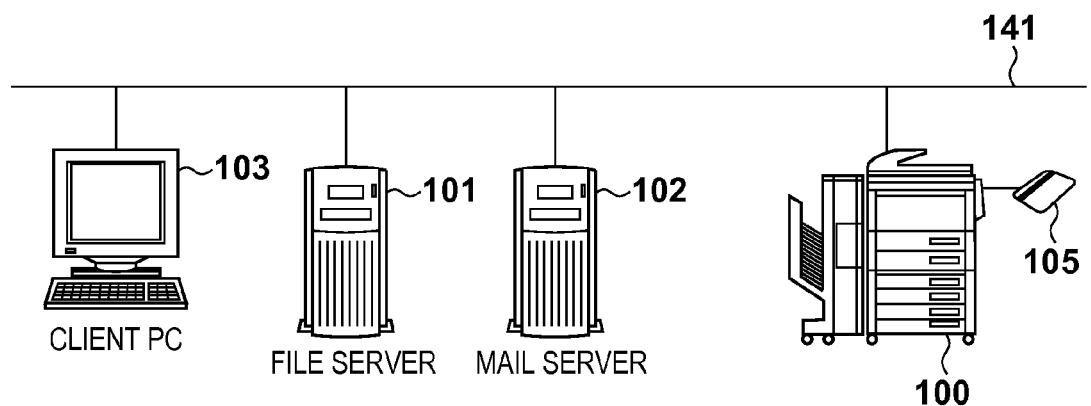
FIG. 1 is a view showing the system configuration according to an embodiment.

An example of the configuration of an image processing system including an image processing apparatus according to an embodiment of the present invention will be described below with reference to FIG. 1. In the image processing system according to this embodiment, an MFP (Multi Function Peripheral) 100, file server 101, mail server 102, and client PC 103 are connected via a network 141.

The MFP 100 is a full-color image processing apparatus which adopts an electrophotography system, and includes copy, FAX, and printer functions. The MFP 100 also includes a SEND function of transmitting an image file read by a scanner to a computer, and an IFAX function of communicating an image read by a scanner with an apparatus of the same type, and printing a received image.

The file server 101 can store image files transmitted from the MFP 100 using communication protocols such as FTP, SMB, and WebDAV. The mail server 102 communicates with the MFP 100, client PC 103, and the like using SMTP and POP3 protocols and can deliver e-mail data attached with image files. The client PC 103 is installed with image viewer software, and can display an image scanned by the MFP 100. Also, the client PC 103 can print this image using the MFP 100 via the printer function. The client PC 103 is also installed with e-mail client software, and can exchange e-mail messages with the mail server 102.

<Hardware Arrangement of Image Processing Apparatus>

An example of the hardware arrangement of the MFP 100 will be described below with reference to FIG. 2. The MFP 100 includes a CPU 130, ROM 131, RAM 132, operation unit 133, scanner 134, printer 135, image processing circuit 136, hard disk 137, network I/F 138, serial I/F 143, formatter unit 139, and FAX unit 140.

Referring to FIG. 2, the CPU 130 is a control circuit, which controls the overall system using programs stored in the ROM 131 and a memory of the RAM 132. The operation unit 133 is a circuit which includes an LCD display panel, hardware keys such as a start key and ten-key pad, and smoothly executes a user operation by displaying software buttons on the LCD and detecting the button touched by the user with the finger.

The scanner 134 reads an image on an original, and outputs read image data in turn for respective pages. The printer 135 prints an image based on image data on a printing medium. The image processing circuit 136 includes a large-capacity image memory, image rotation circuit, resolution conversion circuit, encoding/decoding circuit (for example, MH, MR, MMR, JBIG, JPEG, and so forth), and the like, and can also execute various kinds of image processing such as shading, trimming, and masking.

The hard disk 137 is a large-capacity recording medium connected to an I/F such as SCSI or IDE. The network I/F 138 is a circuit required to connect a network line such as Ethernet® represented by 10BASE-T and 100BASE-T, or token ring. The formatter unit 139 is a rendering circuit required to generate an image to be printed by the printer 135. When PDL (Page Description Language) data is received from the PC via the network I/F 138, the formatter unit 139 generates image data from the received PDL data. Then, the image processing circuit 136 applies image processing to the generated image data, and the printer 135 prints the processed image data.

The scanner 134, printer 135, image processing circuit 136, and formatter unit 139 are connected to a high-speed video bus independently of a CPU bus from the CPU 130, and can transfer image data at high speed. The MFP 100 implements the copy function by applying, using the image processing circuit 136, image processing to image data read by the scanner 134, and printing the read image by the printer 135.

The FAX unit 140 controls FAX communications with an external apparatus on a telephone line 142. That is, the FAX unit 140 can transmit image data, which is read by the scanner 134 and undergoes image processing by the image processing circuit 136, to the external apparatus 142 via the telephone line 142. Also, the FAX unit 140 can receive data from the external apparatus, and can print the received data using the printer 135 after the image processing by the image processing circuit 136. The image processing circuit 136 generates an image of a JPEG, PDF, or TIFF format from image data read by the scanner 134. The MFP 100 implements the SEND function of transmitting, for example, a generated PDF image from the network I/F 138 using communication protocols such as SMTP, FTP, and SMB. In the following description, a function of transmitting an image file of a JPEG, PDF, or TIFF format using an SMTP protocol will be referred to as an e-mail transmitting function, and a function of transmitting an image file using FTP and SMB protocols will be referred to as a file transmitting function. The SEND function includes an Internet FAX (IFAX) function, which is specified by RFC2305 and implements a FAX function by exchanging e-mail messages attached with image files between apparatuses of the same type.

The IFAX function generates a TIFF file specified by RFC3949 from image data read by the scanner 134 using the image processing circuit 136, and transmits the generated TIFF file using an SMTP protocol. Also, the IFAX function receives an e-mail message appended with a TIFF file using an SMTP or POP3 function, converts the TIFF file into an internal image format image using the image processing circuit 136, and then printing that image using the printer 135.

The serial I/F 143 includes, for example, RS232C, and is required to connect an external serial apparatus to the MFP 100. To the serial I/F 143, a card reader 144 is connected, and can read information recorded in a card 105. With this information, user authentication of a card holder can also be executed.

<Command Sequence in Comparative Example>

Command sequences between software modules in an image processing apparatus as a comparative example will be described below. In this case, processing for reading four originals, and transmitting read image data to a predetermined transmit destination in a predetermined format will be described below with reference to FIG. 8.

A transmitting component 800 is a software module required to transmit an image by e-mail transmission, file transmission, FAX transmission, and the like. A SEND module 801 is a software module which controls a general transmitting operation, that is, which issues a reading start instruction to a scanner, and passes a read image to the transmitting component 800. An image processing accepting module 802 is a module which accepts an image conversion request command from a module such as the transmitting component 800. An image conversion module 803 is a module which actually executes image conversion, and cannot process a plurality of commands at the same time. For this reason, the image processing accepting module 802 controls to queue a plurality of accepted image conversion commands, and not to supply a plurality of commands to the image conversion module 803 at the same time. A scanner control module 804 is a software module which issues an image reading instruction to a scanner which feeds an original to a platen and reads an image by photoelectric conversion.

When the user sets an original on a feeder, sets a transmit destination and transmitting file format, and then presses a start key, scan start commands 910 and 911 are supplied from the SEND module 801 to the scanner control module 804 via the image conversion module 803. The scanner control module 804, which received the commands 910 and 911, issues an image reading instruction to the scanner, and returns scan end commands 912, 914, 916, and 918 for respective pages every time reading of each page ends to the image conversion module 803. Also, the command 918 includes information indicating that the last page of an original is read, and the scan operation normally ends.

The image conversion module 803 receives non-compressed color image data from the scanner at a timing of the scan end command for each page from the scanner control module 204. The image conversion module 803 applies JPEG compression to the image data for respective packets each including 32 pixels to generate a packet JPEG (P-JPEG) image, and saves the generated image in a file.

Every time generation of the P-JPEG image ends, the image conversion module 803 returns a command 913, 915, 917, or 919 to the SEND module 801. The command 919 serves as a scan end command.

Upon reception of the scan end command 919, the SEND module 801 sends a transmitting start command 920 including file format information designated by the user to the transmitting component 800. The transmitting component 800, which received the transmitting start command 920, sends an image conversion command 921, 925, 929, or 933 required to convert the P-JPEG image for each page read by the scanner into a file format desired by the user to the image processing accepting module 802.

Upon reception of this command, the image processing accepting module 802 sends an image conversion command 922, 926, 930, or 934 to the image conversion module 803. Every time the image conversion module 803 receives this command, it converts the P-JPEG image read by the scanner into a requested image format, saves the converted image in a file, and returns a result command 923, 927, 931, or 935 indicating the conversion end. Upon reception of this command, the image processing accepting module 802 returns an image conversion end command 924, 928, 932, or 936 to the transmitting component 800. The transmitting component 800, which received these image conversion end commands, transmits the converted image to a destination as the transmit destination, and issues an image conversion command of the next page upon completion of transmission. That is, transmission of the image of the converted page and conversion of that of the next page are executed parallelly. After transmission of the converted data of all the pages, the transmitting component 800 returns a transmission end command 937 to the SEND module 801.

An image conversion time changes depending on an image read by the scanner and a transmitting file format designated by the user. As described above, the MFP as the comparative example operates to read an image in an internal format with which an image read by the scanner can be processed at high speed, and to transmit the image while converting the image to a format desired by the user at the time of transmission. Note that of models which cannot broadcast data to FAX apparatuses or those which do not execute processing such as OCR which requires a long conversion time, MFPs which generate an image in a transmitting file format at the time of scanning, and transmit the generated image at high speed without any image conversion at the time of transmission are available.

<Command Sequence in this Embodiment>

The command sequences between software modules incorporated in the MFP 100 of this embodiment will be described below with reference to FIG. 3. As in the comparative example described above using FIG. 8, processing for reading four originals, and transmitting read image data to a predetermined transmit destination in a predetermined format will be described below.

A transmitting component 200 is a software module required to transmit an image by e-mail transmission, file transmission, FAX transmission, and the like. The file transmission includes modules for respective communication protocols such as SMB, FTP, and WebDAV. A SEND module 201 is a software module which controls a general transmitting operation, that is, which issues a reading start instruction to the scanner 134 and passes a read image to the transmitting component 200. An image processing accepting module 202 is a module which accepts an image conversion request command from modules such as the transmitting component 200. An image processing module 203 is a module which actually executes image conversion using hardware of the image processing circuit 136. The image processing module 203 cannot process a plurality of image conversion commands at the same time due to a limitation on an image conversion memory capacity. However, since the image processing module 203 includes a dedicated image memory for scan control, a scan operation can be performed parallel to another image conversion operation. Since the image processing module 203 cannot process a plurality of image conversion commands at the same time, the image processing accepting module 202 queues the plurality of image conversion commands so as not to supply the plurality of commands to the image processing module 203 at the same time. A scanner control module 204 is a software module which controls the scanner 134, and feeds an original onto a platen and converts an image on the original into image data by photoelectric conversion.

When the user sets originals on a feeder, sets a transmit destination and transmitting file format, and presses the start key, scan start commands 210 and 211 are supplied from the SEND module to the scanner control module 204 via the image processing module. The scanner control module 204, which received the commands 210 and 211, issues an image reading instruction to the scanner 134, and returns a scan end command 212, 214, or 216 for each page to the image processing module 203 every time a page is read. A command 218 is a command which indicates that an original of the last page is read, and the scan operation ends normally.

The image processing module 203 receives non-compressed color image data from the scanner 134 at a timing of the scan end command for each page from the scanner control module 204. The image processing module 203 divides the image data into 32×32 pixel images, applies JPEG compression to the divided images to generate a packet JPEG (P-JPEG) image including a plurality of JPEG images, and saves the image in a file. Since the P-JPEG image handles each image as a small packet, it can be processed at high speed inside the MFP 100, but it cannot be handled outside the MFP 100 since the P-JPEG image format is not a general image format. The image processing module 203 returns a command 213, 215, or 217 to the SEND module 201 every time it completes generation of a P-JPEG image, and returns a scan end command 219 upon completion of scan operations of all the pages.

When the SEND module receives the scan end command 212 of the first page, it issues an image conversion command 221 of the first page to the image processing accepting module 202. The image processing accepting module 202, which received this command, confirms that image conversion of the image processing module 203 is not in progress, and issues an image conversion command 222 of the first page.

The image processing module 203 executes designated image conversion, and returns an image conversion result 223 to the image processing accepting module 202 upon completion of the image conversion. The image conversion processing converts a P-JPEG image as an internal format image of the MFP 100 into a JPEG file as an image of a full page, or converts a color image into a monochrome image, that is, an MMR image. Furthermore, the image conversion processing converts a color image into a highly-compressed image by separating the image into a text region and image region, and changing compression ratios of these regions, and also executes OCR processing for applying OCR to the text region of the image to extract characters. Moreover, not only the image conversion but also conversion of a converted image into a file format such as TIFF, PDF, XPS, or OOXML, which is designated by the user from the operation unit 133, is executed.

Upon complete of the image conversion of the first page, the SEND module 201 checks whether or not scan processing by the scanner 134 is complete. After the SEND module 201 confirms that the scan processing of all the pages is not complete yet, it issues an image conversion command 224 of the second page. This command is supplied to the image processing module 203 as an image conversion command 225. In response to this command, the image processing module 203 executes the image conversion processing, and returns image conversion results 226 and 227 upon completion of the processing.

Since the SEND module 201 receives the scan end command 219 by the scanner 134 at the reception timing of the image conversion result 227, it does not issue an image conversion command of the third page. In other words, upon completion of the conversion processing of a page, which is executed at the reading end timing of an original by the scanner 134, conversion processing of the subsequent pages is not executed (it is executed after transmission is started). Note that since an image conversion time changes depending on a size and resolution of an image to be converted, and a file format to be converted, the image conversion processing is asynchronously executed with respect to the reading operation of the scanner 134, and the number of originals which undergo image conversion by the SEND module 201 changes.

When the image conversion processing, which was instructed during the reading operation of the scanner, is complete after completion of the reading operation by the scanner 134, the SEND module 201 issues a transmitting start command 230 to the transmitting component 200. Upon reception of this command, the transmitting component 200 establishes a connection to a server as a transmit destination, and issues an image conversion command 231 required to convert the P-JPEG image of the first page read by the scanner 134 into a file format designated by the user from the operation unit 133.

The image processing accepting module 202, which received this command, determines whether or not a converted image corresponding to the image of the first page is stored. When the converted image corresponding to the image of the first page is stored, the image processing accepting module 202 returns the converted image as an image conversion result 232 without issuing any conversion command to the image processing module 203. The detailed operation of the image processing accepting module 202 will be described later with reference to FIG. 4.

The transmitting component 200, which received the image conversion result 232, issues an image conversion command 233 by designating a P-JPEG image of the second page while transmitting data of the converted image to the transmit destination designated by the user. Upon reception of this command, the image processing accepting module 202 determines whether or not a converted image corresponding to the image of the second page is stored. When the converted image is stored, the image processing accepting module 202 returns the converted image as an image conversion result 234 to the transmitting component 200 without issuing any conversion command to the image processing module 203.

The transmitting component 200, which received the image conversion result 234, issues an image conversion command 235 by designating a P-JPEG image of the third page while transmitting data of the converted image to the transmit destination designated by the user. Upon reception of this command, the image processing accepting module 202 determines whether or not a converted image corresponding to the image of the third page is stored. In this case, since no converted image is stored, the image processing accepting module 202 issues an image conversion command 236 to the image processing module 203.

Upon reception of the command, the image processing module 203 executes designated image conversion, and returns an image conversion result 237 upon completion of the conversion. Furthermore, the image processing accepting module 202 returns the converted image to the transmitting component 200 as an image conversion result 238.

The transmitting component 200, which received the image conversion result 238, issues an image conversion command 239 by designating a P-JPEG image of the fourth page while transmitting data of the converted image to the transmit destination designated by the user. The image processing accepting module 202, which received this command, issues an image conversion command 240 to the image processing module 203 since no converted image of the image of the fourth page is stored. The image processing module 203 converts the P-JPEG image of the fourth page into a designated image, and returns the converted image as an image conversion result 241 upon completion of the conversion. Furthermore, the image processing accepting module 202 returns the converted image as an image conversion result 242 to the transmitting component 200. The transmitting component 200, which received the image conversion result 242, transmits data of the converted image to the transmit destination designated by the user. Upon completion of the transmission, the transmitting component 200 closes the connection, and returns a transmitting end command 243 to the SEND module 201, thus ending the transmitting processing.

<Document Management>

Figure 4:
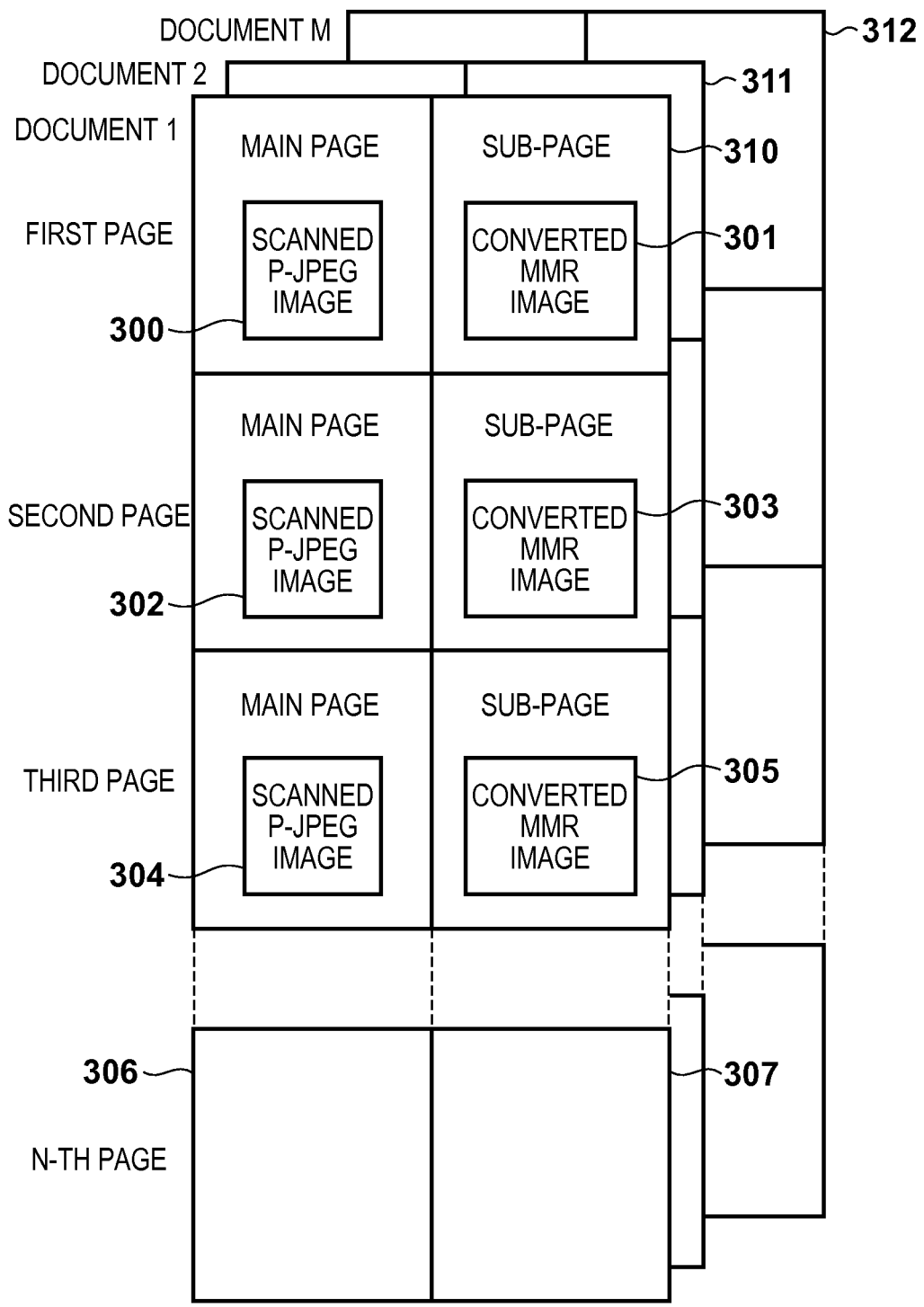
FIG. 4 is an explanatory view of document management according to the embodiment.

Document management inside the MFP 100 will be described below with reference to FIG. 4. Reference numeral 310 denotes one document, which includes 1 to N (N is a natural number) pages. The MFP 100 can manage M (M is a natural number) documents as a whole.

The total number of pages which can be managed by the MFP 100 is determined in advance. When the number of pages of one document increases, the value N is increased; when documents including many pages are managed, the value M is decreased. Each page includes a main page and sub-page, and these pages are managed in association with each other. When an image is scanned by the scanner 134 first, the scanned image is registered in the main page.

A scanned image of the first page is registered in a main page 300 after P-JPEG conversion, and no image is registered in a sub-page 301. A scanned image of the second page is registered in a main page 302 after P-JPEG conversion, and no image is registered in a sub-page 303. Likewise, a scanned image of the N-th page is registered in a main page 306 after P-JPEG conversion, and no image is registered in a sub-page 307.

Figure 3:
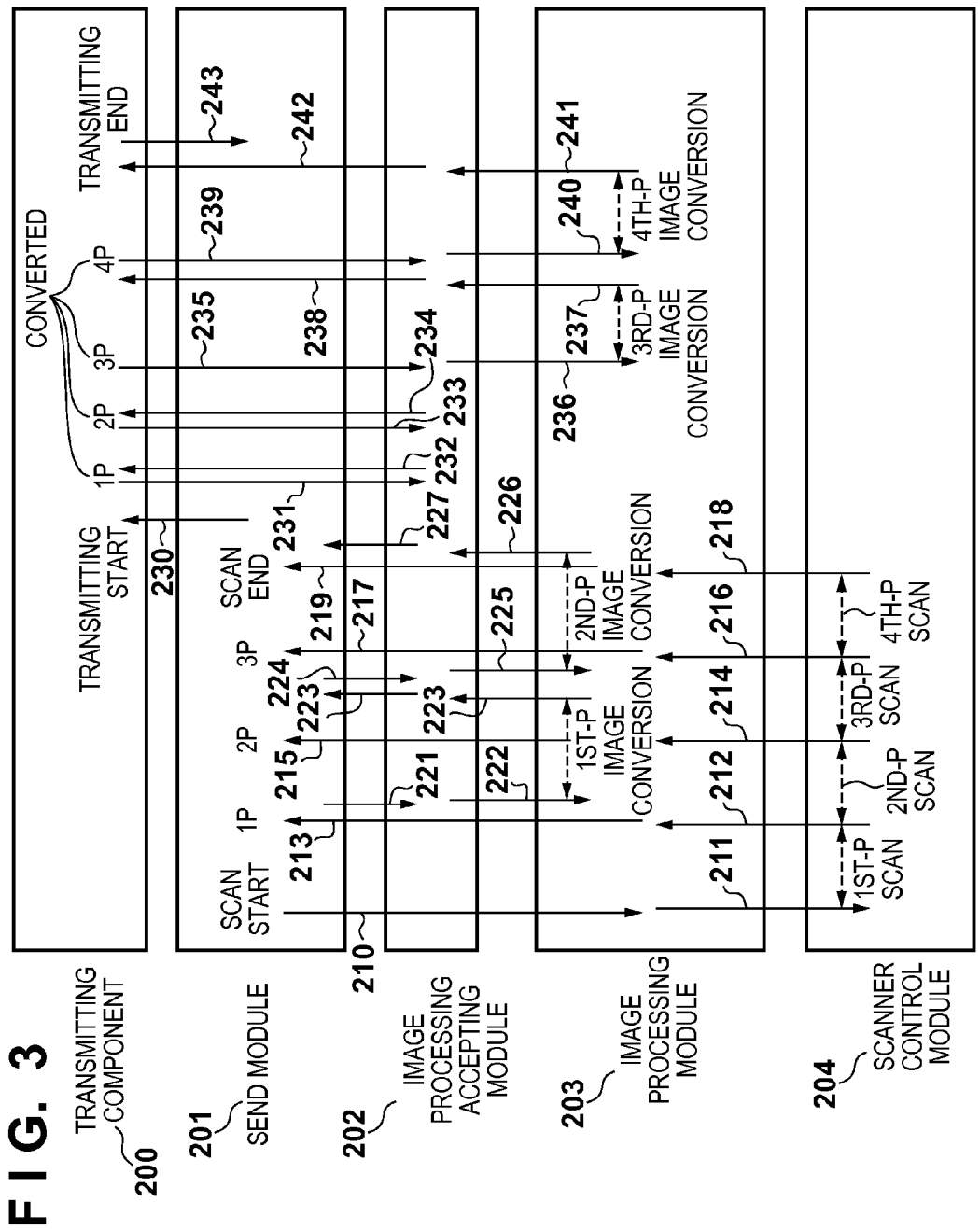
FIG. 3 is a chart showing the command sequences of software modules according to the embodiment.

When image conversion of the first page is instructed using the image conversion commands 221 and 222 in FIG. 3, a converted image is returned to the SEND module 201. The SEND module 201 registers the converted image in the sub-page 301 of the first page. Also, when the image conversion commands 224 and 225 instruct image conversion of the second page, a converted image is returned to the SEND module 201. The SEND module 201 registers the converted image in the sub-page 303 of the second page.

Upon reception of the image conversion command 231, since the converted image is registered in the sub-page 301 of the first page, the image processing accepting module 202 returns the image in the sub-page 301 as the image conversion result 232 without executing actual conversion by the image processing module 203. Likewise, upon reception of the image conversion command 233, since the converted image is registered in the sub-page 303 of the second page, the image processing accepting module 202 returns the image in the sub-page 303 as the image conversion result 234 without executing actual conversion by the image processing module 203.

On the other hand, upon reception of the image conversion command 235, since no converted image is registered in a sub-page 305 of the third page, the image processing accepting module 202 executes actual conversion by the image processing module 203, and returns an image-converted image as the image conversion result 238. The image conversion command 239 is similarly processed, and the image processing accepting module 202 executes actual conversion by the image processing module 203, and returns an image-converted image as the image conversion result 242.

In this way, in the MFP 100 according to this embodiment, image data read by the scanner 134 is registered in the main page, and image data converted into a transmitting format is registered in the sub-page. Furthermore, the MFP 100 converts read image data into a transmitting format as needed while reading an image by the scanner 134. As a result, the image conversion processing can be efficiently executed compared to a case in which conversion of image data is started after all original pages are read.

<Processing of SEND Module>

Figure 5:
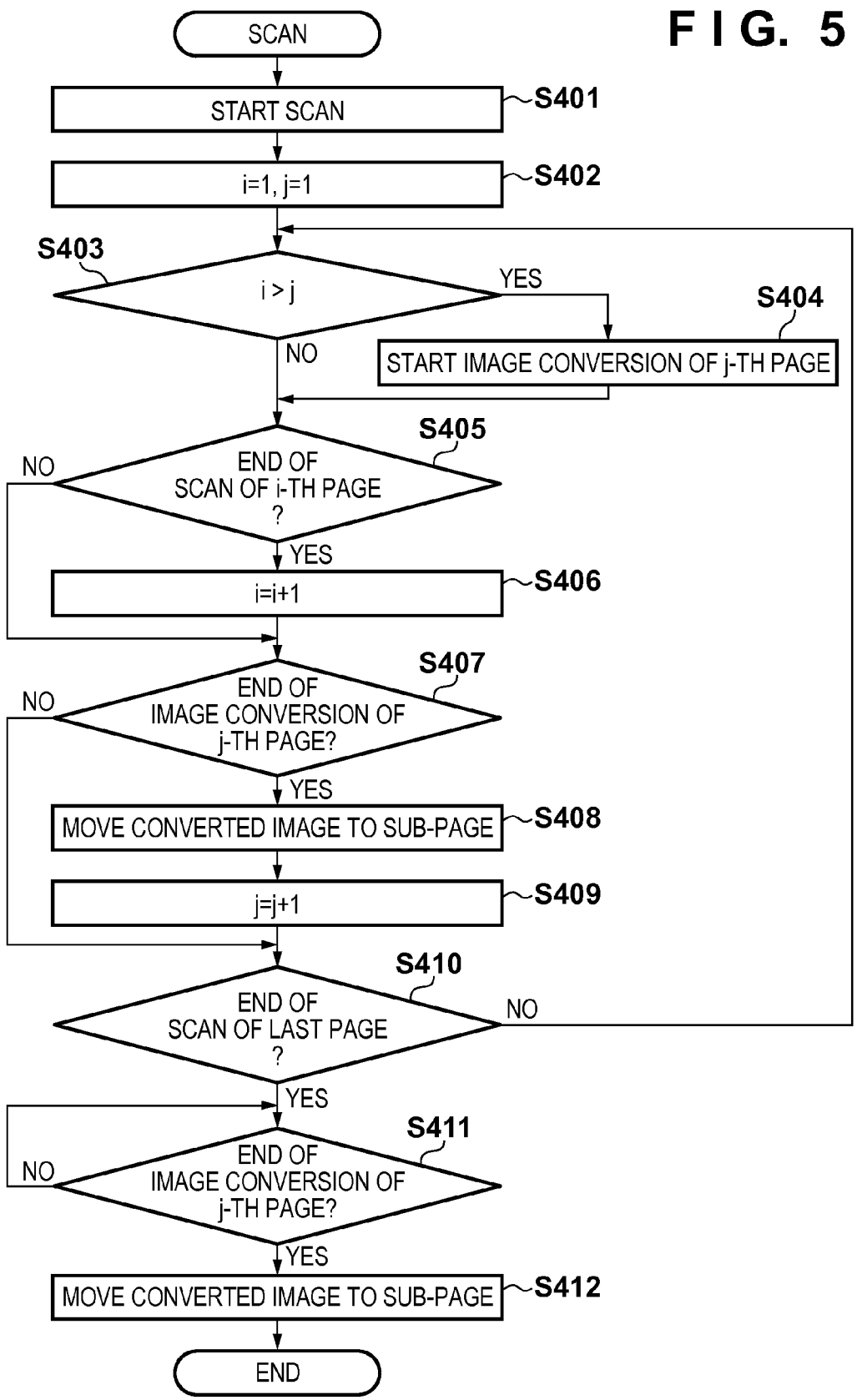
FIG. 5 is a flowchart for explaining the operation of a SEND module according to the embodiment.

The processing in the SEND module 201 of the MFP 100 will be described below with reference to FIG. 5. The processing to be described below is implemented when the CPU 130 reads out a control program stored in the ROM 131 onto the RAM 132 and executes the readout program. Also, this flowchart is started when the user sets a transmitting file format and makes scan settings and transmit destination settings on the operation unit 133 and presses the start key.

In step S401, the SEND module 201 activates the scanner 134 to feed an original set on the feeder and to start an original reading operation. Subsequently, in step S402, the SEND module 201 sets "1" in variables i and j as initial values. The SEND module 201 checks in step S403 if the variable i is larger than the variable j. If the variable i is larger than the variable j, the SEND module 201 controls the image processing module 203 to apply image conversion of an image of the first page via the image processing accepting module 202 in step S404, and the process then advances to step S405. On the other hand, if the SEND module 201 determines in step S403 that the variable i is equal to or smaller than the variable j, the process advances to step S405.

The SEND module 201 determines in step S405 whether or not the scan operation of the i-th page is complete. If the scan operation is complete, the process advances to step S406, and the SEND module 201 increments the variable i by 1. Then, the process advances to step S407. On the other hand, if the SEND module 201 determines in step S405 that the scan operation is not complete yet, the process jumps to step S407. The SEND module 201 determines in step S407 whether or not the image conversion of the first page executed in step S404 is complete. If the image conversion is not complete yet, the process jumps to step S410. On the other hand, if an image conversion result is received, and the image conversion is complete, the process advances to step S408, and the SEND module 201 moves (registers) the converted image to the sub-page of the j-th page, as shown in FIG. 4. The SEND module 201 increments the variable j by 1 in step S409, and the process then advances to step S410.

The SEND module 201 determines in step S410 whether or not the scan operation of the last page is complete by checking whether or not it receives the scan end command 219. If the SEND module 201 does not receive any scan end command, the process returns to step S403; otherwise, the process advances to step S411, and the SEND module 201 waits until the image conversion of the j-th page, that is, the current page which is undergoing the image conversion, is completed. If the image conversion of the j-th page is complete, the SEND module 201 moves the converted image to a sub-page in step S412, thus ending the processing. In this manner, according to this embodiment, processing for converting image data read by scanning into a transmitting format is executed parallelly until scan processing of all pages is complete.

<Processing of Transmitting Component 200>

Figure 6:
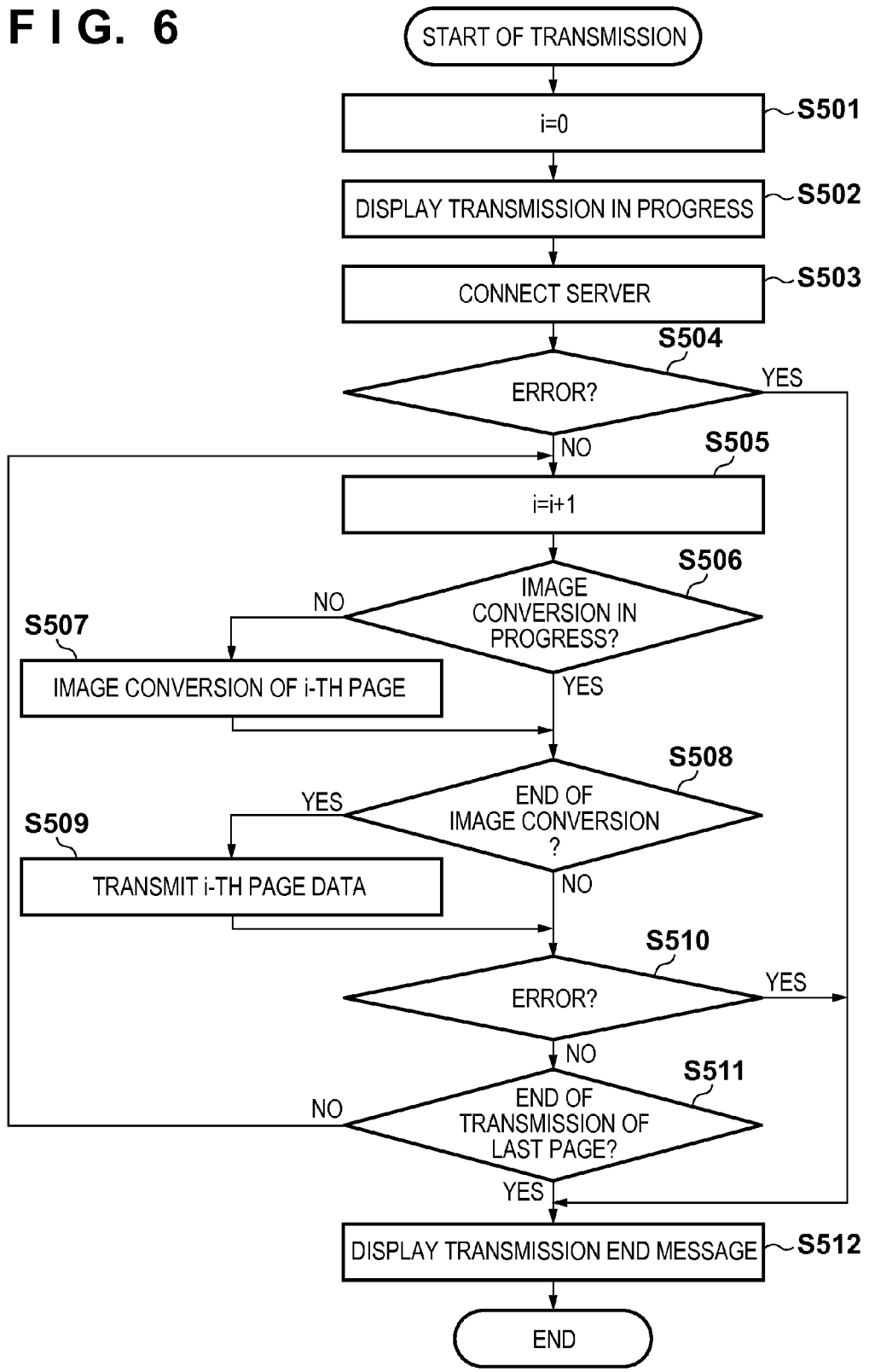
FIG. 6 is a flowchart for explaining the operation of a transmitting component according to the embodiment.

The processing in the transmitting component 200 will be described below with reference to FIG. 6. The processing to be described below is implemented when the CPU 130 reads out a control program stored in the ROM 131 onto the RAM 132 and executes the readout program. Also, this flowchart is started when the transmitting component 200 receives the transmitting start command 230 from the SEND module 201.

The transmitting component 200 initializes a variable i by zero in step S501, and displays a transmission in progress message on the operation unit 133 in step S502. Subsequently, the transmitting component 200 establishes a connection to a server as the transmit destination in step S503, and determines in step S504 whether or not a connection error has occurred. If a connection error has occurred, the process jumps to step S512, and the transmitting component 200 displays a message on the operation unit 133, thus ending the processing in step S513.

If a connection to the server is normally complete, the process advances to step S505, and the transmitting component 200 increments the variable i by 1. In this case, the transmitting component 200 inputs an image conversion command to the image processing accepting module 202, and determines in step S506 whether or not the image conversion is in progress by managing whether or not it receives an image conversion result command in response to the image conversion command.

If the transmitting component 200 determines in step S506 that it receives the image conversion result command, it determines that the image conversion is complete, and the process advances to step S507. In step S507, the transmitting component 200 issues an image conversion command of the i-th page to start image conversion. On the other hand, if the transmitting component 200 determines in step S506 that it does not receive any image conversion result command, it determines that the image conversion is in progress. Then, the transmitting component 200 determines in step S508 whether or not the image conversion is compete. If the image conversion is complete, the process advances to step S509, and the transmitting component 200 transmits the converted image data of the i-th page. On the other hand, if the image conversion is not complete yet, the process advances to step S510, and the transmitting component 200 determines whether or not an error has occurred. If an error has occurred, the transmitting component 200 displays an error message on the operation unit 133 in step S512, thus ending the processing.

On the other hand, if no error occurs, the process advances to step S511, and the transmitting component 200 checks if transmission of the last page is complete. If transmission of the last page is not complete yet, the process returns to step S505. If image transmission of the last page is complete, the process advances to step S512, and the transmitting component 200 displays a message indicating that transmission is complete on the operation unit 133, thus ending the processing.

Figure 8:
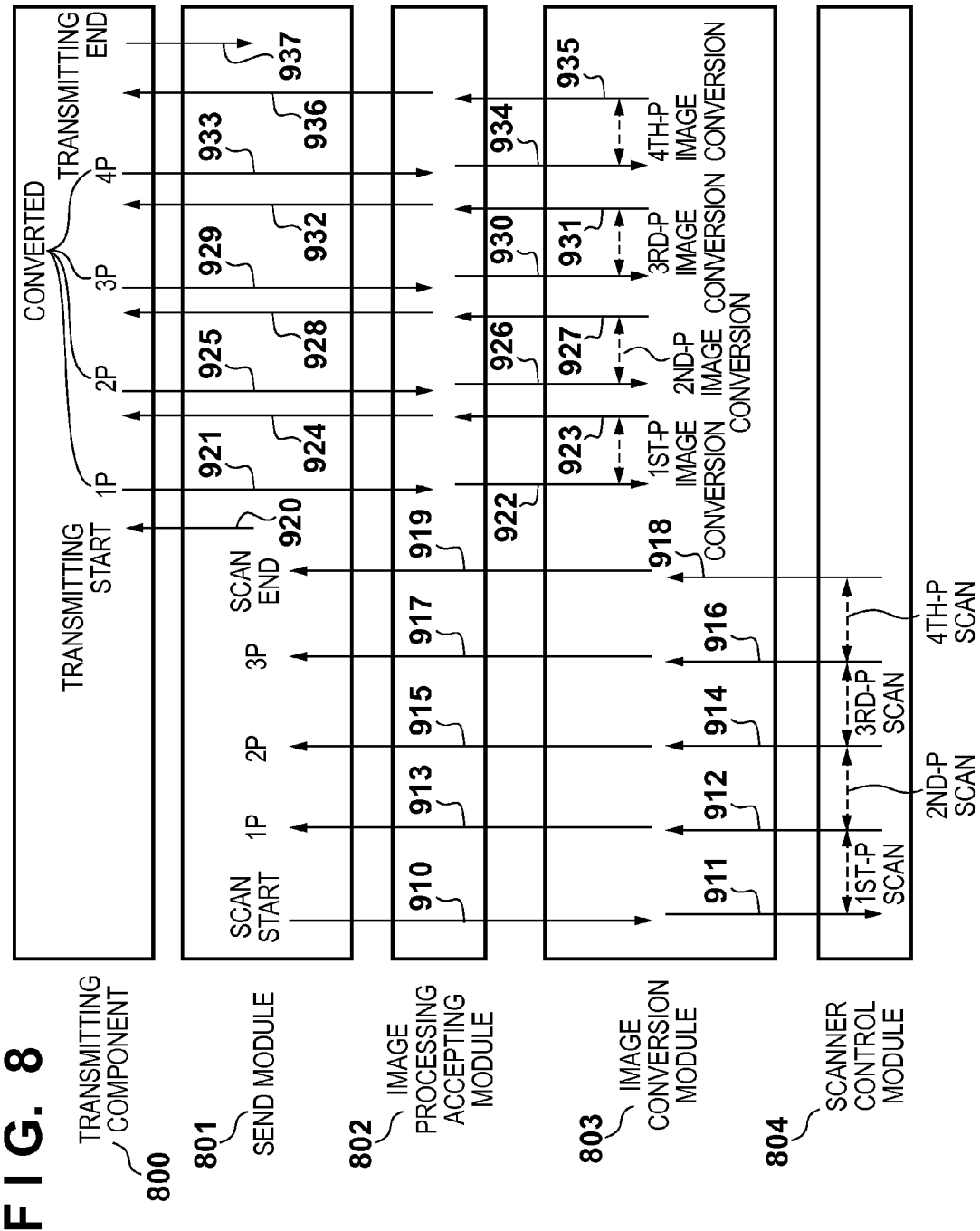
FIG. 8 is a chart for explaining the command sequences according to a comparative example.

Note that the processing of the transmitting component is the same as the operation of the comparative example described as a general example using FIG. 8. For this reason, there is a merit of high-speed processing without changing the software of the transmitting component 200. The transmitting component can be described using an uninstallable and exchangeable program like Java, and can use a conventionally running program without changing it.

<Processing of Image Processing Accepting Module 202>

Figure 7:
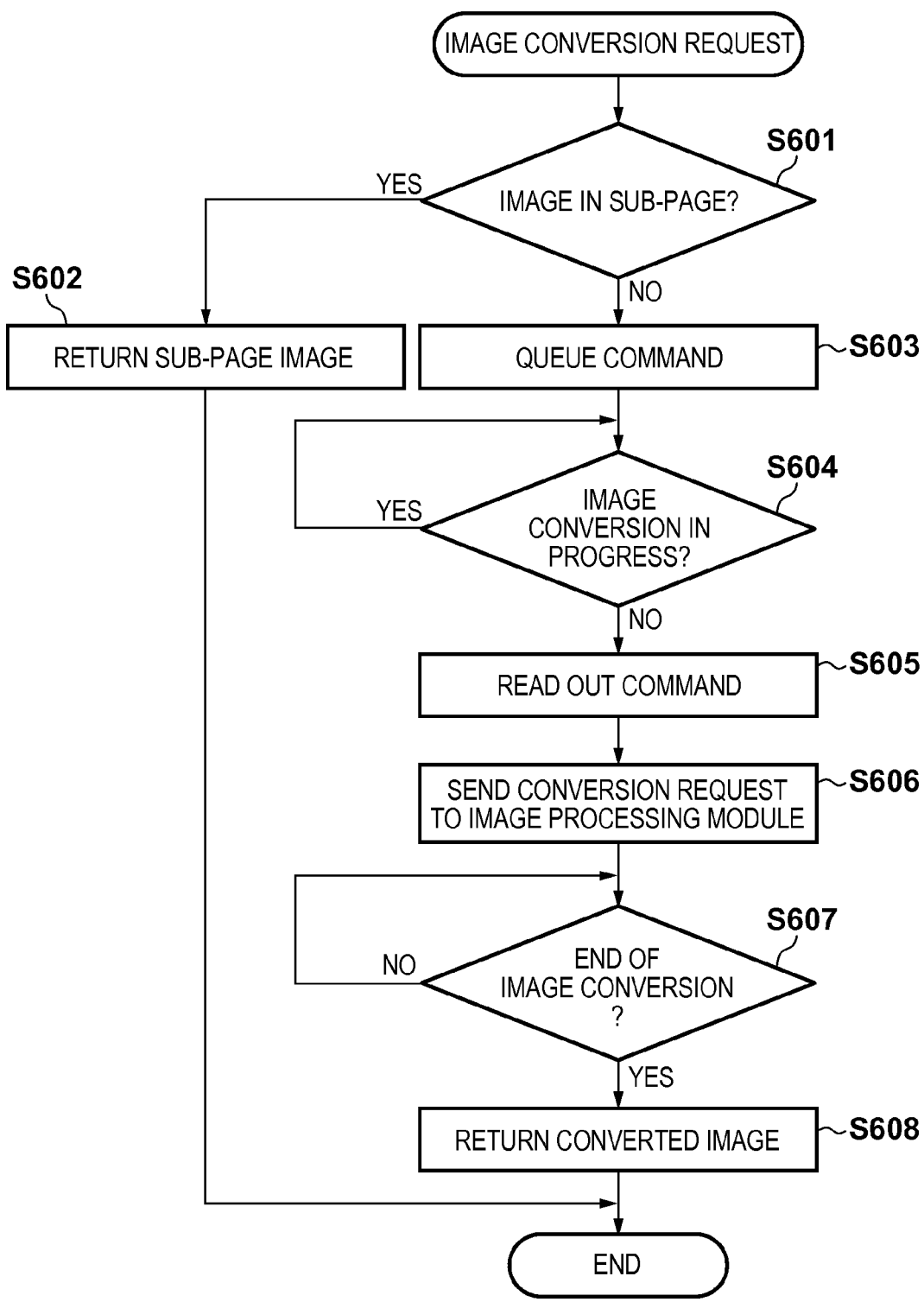
FIG. 7 is a flowchart for explaining the operation of an image processing accepting module according to the embodiment.

The processing in the image processing accepting module 202 will be described below with reference to FIG. 7. The processing to be described below is implemented when the CPU 130 reads out a control program stored in the ROM 131 onto the RAM 132 and executes the readout program. Also, this flowchart is started when the image processing accepting module 202 receives an image conversion command from the SEND module 201 and transmitting component 200.

The image processing accepting module 202 checks in step S601 whether or not an image is registered in a sub-page of an image whose image conversion is instructed. If an image is registered in the sub-page, the process advances to step S602, and the image processing accepting module 202 returns the image of the sub-page as a converted image, thus ending the processing. On the other hand, if no image is registered in the sub-page, the process advances to step S603, and the image processing accepting module 202 queues the received image conversion command. That is, the image processing accepting module 202 queues the received image conversion command if the processing of the image processing module 203 is in progress.

The image processing module 203 cannot process a plurality of images at the same time due to a limitation on the memory capacity. For tis reason, when a plurality of commands (image data requests) are simultaneously received from the SEND module 201 and transmitting component 200, the image processing accepting module 202 copes with these commands by queuing them.

Next, in step S604, the image processing accepting module 202 monitors whether or not the image conversion processing of the image processing module 203 is in progress, and waits until the image conversion is complete. If the image conversion is complete, the process advances to step S605, and the image processing accepting module 202 reads out a queued command. In step S606, the image processing accepting module 202 issues the image conversion command to the image processing module 203. In step S607, the image processing accepting module 202 waits until the image conversion is complete. If the image conversion is complete, the process advances to step S608, and the image processing accepting module 202 returns the converted image to a command issuance source, thus ending the processing.

As described above, the MFP 100 of this embodiment converts image data of an already read page parallel to a reading operation of an original. After completion of the reading operations of originals, image data of a page to be converted is converted parallel to transmission of the converted image data of the page. Thus, both the demands of the user who wants to leave the MFP with the already read originals, and the user who wants to follow up completion of transmission earlier can be satisfied.

<Transmitting Operation>

Figure 9:
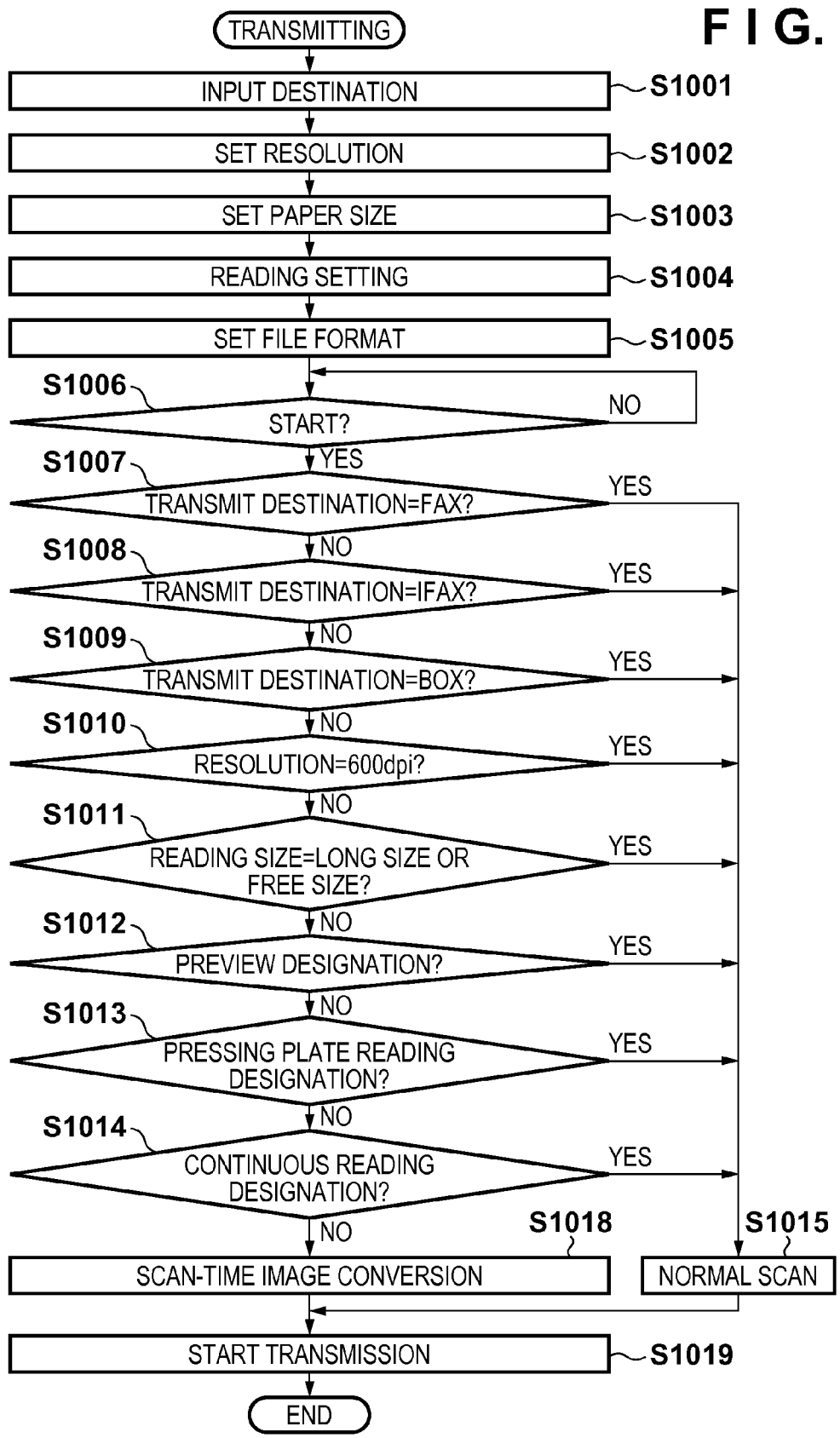
FIG. 9 is a flowchart for explaining the transmitting operation according to the embodiment.

The processing sequence of the transmitting operation will be described below with reference to FIG. 9. The processing to be described below is implemented when the CPU 130 reads out a control program stored in the ROM 131 onto the RAM 132 and executes the readout program. Also, this flowchart is started when the user selects a transmitting tab displayed on the operation unit 133. Processing for determining whether a job is executed in a first mode in which after images are read from all pages of originals by the scanner, image data are converted into a predetermined transmitting format and the converted data are transmitted or in a second mode in which until images are read from all pages of originals by the scanner, image data is converted into a predetermined transmitting format in turn from the read page and the converted data is transmitted will be described below.

In step S1001, the CPU 130 sets a transmit destination. The transmit destination includes a FAX destination, an IFAX destination used to exchange data like FAX by appending a read original to an e-mail message, a file transmit destination used to transmit data to a folder of the PC using communication protocols such as SMB/FTP/WebDAV, and an e-mail destination of transmission of data appended to an e-mail message. Furthermore, a BOX destination of saving data in the hard disk of the MFP 100 can be designated. For example, the CPU 130 displays choices on the operation unit 133, and sets a transmit destination according to the user input.

In step S1002, the CPU 130 sets a resolution of an image to be read by the scanner 134. For example, the CPU 130 sets a resolution from 200×200 dpi, 300×300 dpi, 400×400 dpi, and 600×600 dpi displayed on the operation unit 133 according to the user input. When a monochrome image is to be read, resolutions of 200×100 dpi and 200×400 dpi are added to choices, and when a color image is to be read, a resolution of 100×100 dpi is added to choices.

In step S1003, the CPU 130 sets a paper size of an original set on the feeder or a pressing plate as a glass surface of the scanner 134. The CPU 130 can select a paper size from auto, A3, A4, A5, B4, B5, 11×17, LGL, LTR, STMT, long size, and free size, which are displayed on the operation unit 133. The long size is long paper such as roll paper, and a sheet up to a maximum of 640 mm can be read. However, since this paper size requires a large capacity of the memory, a function such as double-sided reading cannot be used. The free size is a paper size of an indeterminate form, and since the method of detecting the trailing end of an image is the same as that for the long size, the same reading operation as that for the long size is performed. However, since a maximum size in a lateral direction is limited to 17 inches, there is no limitation unlike the long size (for the long size, the double-sided reading function is disabled due to a memory limitation), and the free size allows to use the double-sided reading function.

In step S1004, the CPU 130 sets as a reading setting whether colors upon reading an original are automatically detected or an original is to be read as a color image/grayscale image/monochrome binary image. Also, the CPU 130 can designate an original reading method such as single-sided/double-sided, and can set a function of magnification designation upon reading (for example, whether or not a bundle of originals to read includes different paper sizes). If a mixed original mode is OFF, since an original size of only the first page is detected, and the second and subsequent pages are read based on the size of the first page, the scan operations can be speeded up.

Furthermore, since originals of about 100 pages can only be placed on the feeder, a continuous reading function for continuously reading a plurality of bundles of originals and transmitting the read images as one file so as to handle originals over 100 pages as one file is available. When the continuous reading function is designated, if reading of one original bundle is complete, the control prompts the user to select whether or not to end the reading operation. If the user selects "continue", the next original bundle is read, and is combined to the previously read bundle when they are transmitted. As for the reading setting in step S1004, a switch for designating a preview function which displays read images on the operation unit 133 before transmission, and can transmit images after unnecessary pages are deleted is provided.

In step S1005, the CPU 130 sets a transmitting file format. For example, the CPU 130 can set to apply image conversion to a read original to obtain a file format such as TIFF, JPEG, PDF, XPS, or OOXML, and can transmit the converted file. Furthermore, in case of PDF or the like, a function such as OCR, high-compression PDF in which an image is region-separated into a text part and image part, and a compression method is changed for respective images to reduce a data size, e-signed PDF, and the like can be designated.

The CPU 130 determines in step S1006 whether or not the START key is pressed. If the START key is pressed, the process advances to step S1007; otherwise, the determination process of step S1006 is periodically repeated. The CPU 130 determines in step S1007 whether or not the transmit destination is a FAX destination. Also, the CPU 130 determines in step S1008 whether or not the transmit destination is an IFAX destination. If the transmit destination is a FAX or IFAX destination, the process advances to a normal scan in step S1015. The CPU 130 controls to execute a normal scan, that is, a scan for performing only the scan operation described using FIG. 8 in step S1015, and to transmit image data while converting an image by the transmitting component after the scan in step S1019.

In this scan, since the scan and image conversion/transmitting operations are continuously executed, the transmitting speed lowers consequently. However, in the FAX transmission, a communication is made with the transmit destination after completion of the scan, and a transmitting image format is decided after mutual image communication performances are negotiated. Therefore, even when some images are converted during the scan described using FIG. 3, they may be converted into a format different from the negotiation result, and re-conversion may be required, thus disturbing high-speed transmission. Conversely, as a result of repetitive image conversion, images may deteriorate. In case of the IFAX destination as well, since images which can be transmitted are different for respective transmit destinations, if broadcasting is designated for a plurality of destinations, images cannot be transmitted unless re-conversion is executed. Therefore, if the CPU 130 determines in step S1007 or S1008 that the transmit destination is a FAX or IFAX destination, the normal scan with a low transmission speed is selected.

If the transmit destination is not a FAX or IFAX destination, the process advances to step S1009, and the CPU 130 determines whether or not the transmit destination includes a BOX destination. In case of the BOX destination, scanned images are stored in the hard disk 137 for a long period of time. Each image to be stored includes data of a sub-page in addition to that of a main page generated by scanning, as has been described above using FIG. 4. Therefore, since data of sub-pages are left stored in the hard disk 137 for a long period of time, and may compress the capacity of the hard disk 137, if the transmit destination includes a BOX destination in step S1009, the process advances to the normal scan in step S1015.

If the transmit destination does not include a BOX destination, the process advances to step S1010, and the CPU 130 determines whether or not a scan resolution is equal to or higher than a predetermined value, for example, 600 dpi. In the scan-time image conversion in which some images are converted during the scan, as described above using FIG. 3, image read/write accesses are frequently made during the scan. For this reason, the reading speed of the scanner 134 unwantedly lowers. Especially, such low reading speed is conspicuous in a high-speed scan machine in which the scan speed exceeds 100 pages per min when the scanner 134 is set in the double-sided reading mode. Most of users get back to their desks with scan-completed originals at the scanner 134, and do not wait for completion of transmission in front of the MFP 100. Hence, if the reading speed lowers, to purchase an expensive, high-speed MFP purposely becomes meaningless. Therefore, when the resolution setting in step S1002 is 600 dpi as the highest resolution, the process advances from step S1010 to the normal scan in step S1015, so as to prevent the scan speed from lowering.

If the resolution is not 600 dpi, the process advances to step S1011, and if the CPU 130 determines in step S1011 that the reading setting in step S1004 is a long size or free size setting, the process advances to the normal scan in step S1015. At the time of long/free size reading as well, image conversion is executed using hardware included in the image processing circuit 136 in the same manner as another reading control and image conversion processing. Basically, hardware is configured to allow parallel concurrent operations of the reading control and image conversion processing. However, since long-size or free-size paper is not used much, some control operations are configured to use hardware for the image conversion processing so as to attain a cost reduction. For this reason, when the long-size reading operation is made during image conversion, the two operations cannot be executed at the same time, and the reading operation is unwantedly stopped, thus posing a problem. In order to avoid this problem, if the reading setting in step S1004 is the long size or free size setting, the process advances to the normal scan in step S1015.

If the reading size is not the long size or free size, the process advances to step S1012, and the CPU 130 determines whether or not the preview function is set in step S1004. If the preview function is set in step S1004, the process advances to the normal scan in step S1015. On the other hand, if the preview function is not designated, the process advances to step S1013, and the CPU 130 determines whether or not a pressing plate reading operation of an original to be read, which is set on the glass surface of the scanner 134, is to be executed. If the pressing plate reading operation is to be executed, the process advances to the normal scan in step S1015.

If the pressing plate reading operation is not designated, the process advances to step S1014, and the CPU 130 determines whether or not the continuous reading designation is made. If the continuous reading designation is made, the process advances to the normal scan in step S1015. On the other hand, if the continuous reading designation is not made, the process advances to step S1018, and the CPU 130 executes a scan in the mode in which the image conversion is executed at the time of a scan, as described above with reference to FIG. 3, and the process advances to step S1019. In step S1019, the transmitting component 200 executes the transmitting operation to transmit scan data, thus ending the processing.

<Transmitting Operation in Case of Preview Designation>

Figure 10:
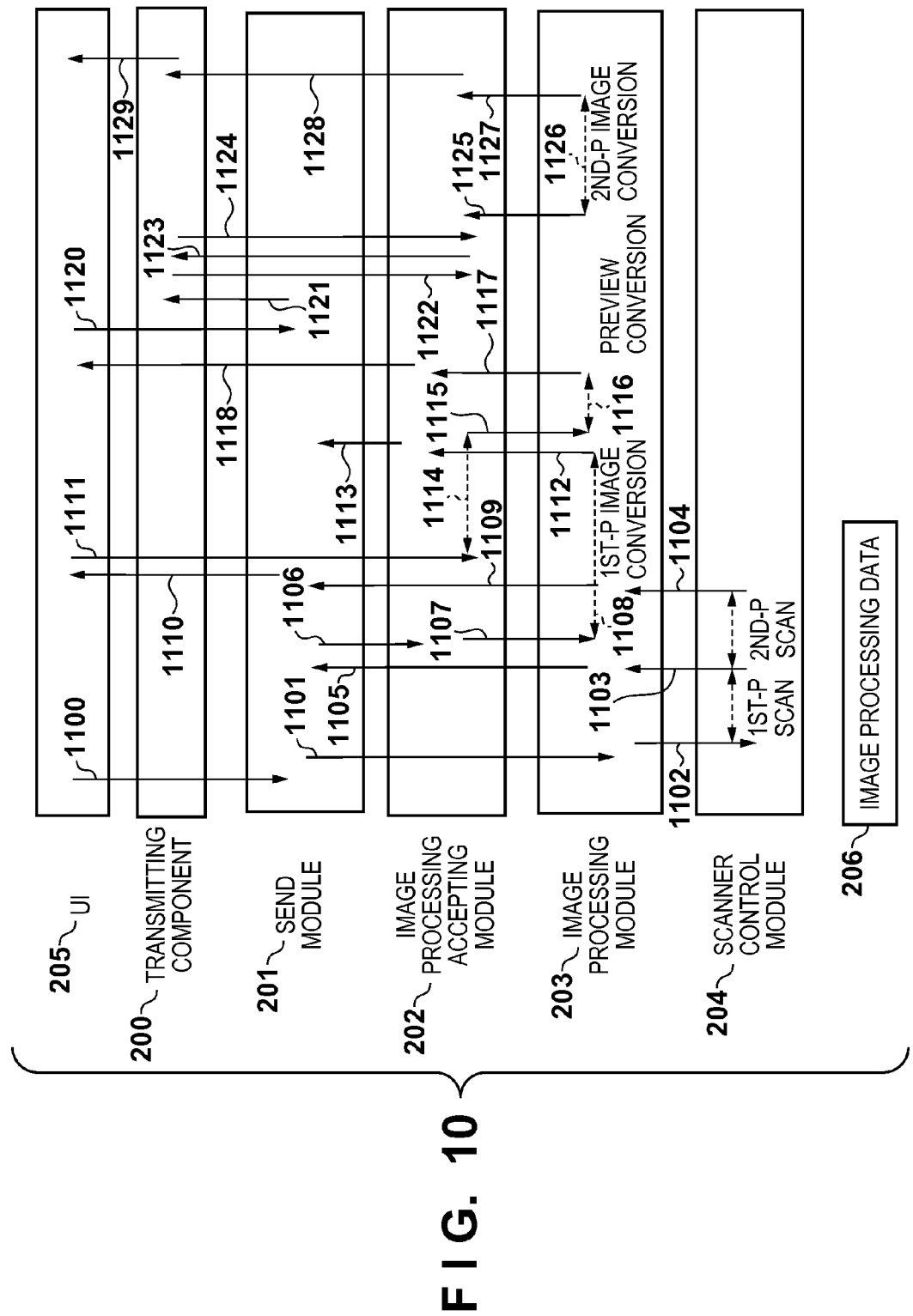
FIG. 10 is a command sequence chart at the time of a preview operation according to the embodiment.

A case will be described below with reference to FIG. 10 wherein the transmitting operation described using FIG. 3 is to be executed when a preview-designated transmitting instruction of originals of two pages is issued. Reference numeral 205 denotes a UI which is a module required to control the operation unit 133.

A preview-designated transmitting start command 1000 from the UI 205 is supplied to the SEND module 201, which issues a scan start command 1101 to the scanner control module as a command 1102. The scanner control module 204 controls the scanner 134 to convey originals set on the feeder to the platen, to read data of the originals, and to discharge the originals.

Upon completion of reading of the original of the first page, the scanner control module 204 returns a scan end command 1103 for each page to the image processing module. Upon completion of reading of the original of the second page, the scanner control module 204 returns a scan end command 1104. The image processing module 203, which received the command 1103, notifies the SEND module 201 of completion of the scan of the first page using a command 1105. The SEND module 201 issues an image conversion command 1106 to the image processing module 203 so as to apply image conversion to data of the first page. This command is supplied to the image processing module 203 as a command 1107, thus starting the image conversion processing of the first page.

Upon completion of the scan of the second page as the last page, a scan end command 1109 is output, and this signal is transferred to the UI 205 as a command 1110. The UI 205 displays a message "scan in progress" when it has issued the transmitting start command 1100, and clears the message when it receives the command 1110.

Since an image size read by the scanner 134 is large, and a special image format is set, even when the preview function is designated, the UI 205 cannot display the image intact. For this reason, the UI 205 transmits an image conversion command 1111 to the image processing accepting module to reduce the image and to convert it into an image format which can be displayed intact on the UI unit 205. Since the image conversion based on the command 1107 is not complete yet, the image processing accepting module 202 waits for command issuance to the image processing module 203 until that image conversion is complete.

When the image conversion of the first page is complete, that fact is informed to the image processing accepting module 202 using a command 1112, and is also informed to the SEND module using a command 1113. Upon reception of the end command of the image conversion based on the command 1107, the image processing accepting module 202 issues an image conversion command 1115 of a preview image to the image processing module 203. When the conversion of the preview image is complete, the image processing module 203 and image processing accepting module 202 notifies the UI 205 of that fact respectively using commands 1117 and 1118, thus displaying the image on the UI 205.

The UI 205 displays the preview image, and when the user presses "transmitting" button, a transmitting start command 1120 is sent to the SEND module 201, and a transmitting start command 1121 is issued to the transmitting component 200. The transmitting component 200 issues an image conversion command 1122 to the image processing accepting module 202. Since the image of the first page has already undergone the image conversion in the command 1107, actual conversion of the image is not executed, and the image registered in the sub-page described using FIG. 4 is returned to the transmitting component 200 as the converted image using a command 1123.

The transmitting component 200 issues an image conversion command 1124 required to convert the image of the second page to the image processing accepting module 202 while transmitting the converted image to the transmit destination. Since no image conversion is applied to the image of the second image, no data is registered in the sub-page of the document management. For this reason, an image conversion command 1125 is issued to the image processing module 203 so as to execute actual image conversion. The image processing module 203 executes the image conversion of the second page, and completes the conversion after an elapse of a time 1126. Conversion end commands 1127 and 1128 are supplied to the transmitting component 200, thus transmitting data of the second page. Upon completion of transmission, the UI 205 is notified of a transmitting result 1129, clears a display message indicating that transmission is in progress, and displays a transmission end message for a predetermined time.

In the aforementioned operation example, when the normal scan is executed, as shown in FIG. 8, a preview image can be displayed after an elapse of a preview image conversion time 1116 after the scan. However, a preview image is displayed after an elapse of times 1114 and 1116. The time 1114 changes depending on the image conversion processing based on the command 1117, and 5 sec or longer are required to convert an image into a complicated file format (for example, a high resolution, large paper size, OCR processing, OOXML, etc.) In this manner, since a problem is posed when a preview image is displayed after an elapse of 5 sec since completion of reading of the scanner 134, if the preview function is designated in step S1012 in FIG. 9, the process advances to the normal scan in step S1015.

Image processing data 206 is used when a file including a plurality of pages is processed as one file. Image data of a plurality of pages such as PDF data require various kinds of information such as a header and footer in addition to images, and footer data of the first page influences header data of the second page. Since the image conversion is executed for each page, the image processing data 206 stores footer information of the first page, and header information is generated with reference to that data upon execution of the image conversion of the second page in the aforementioned case.

<Transmitting Operation in Case of Pressing Plate Reading Designation>

Figure 11:
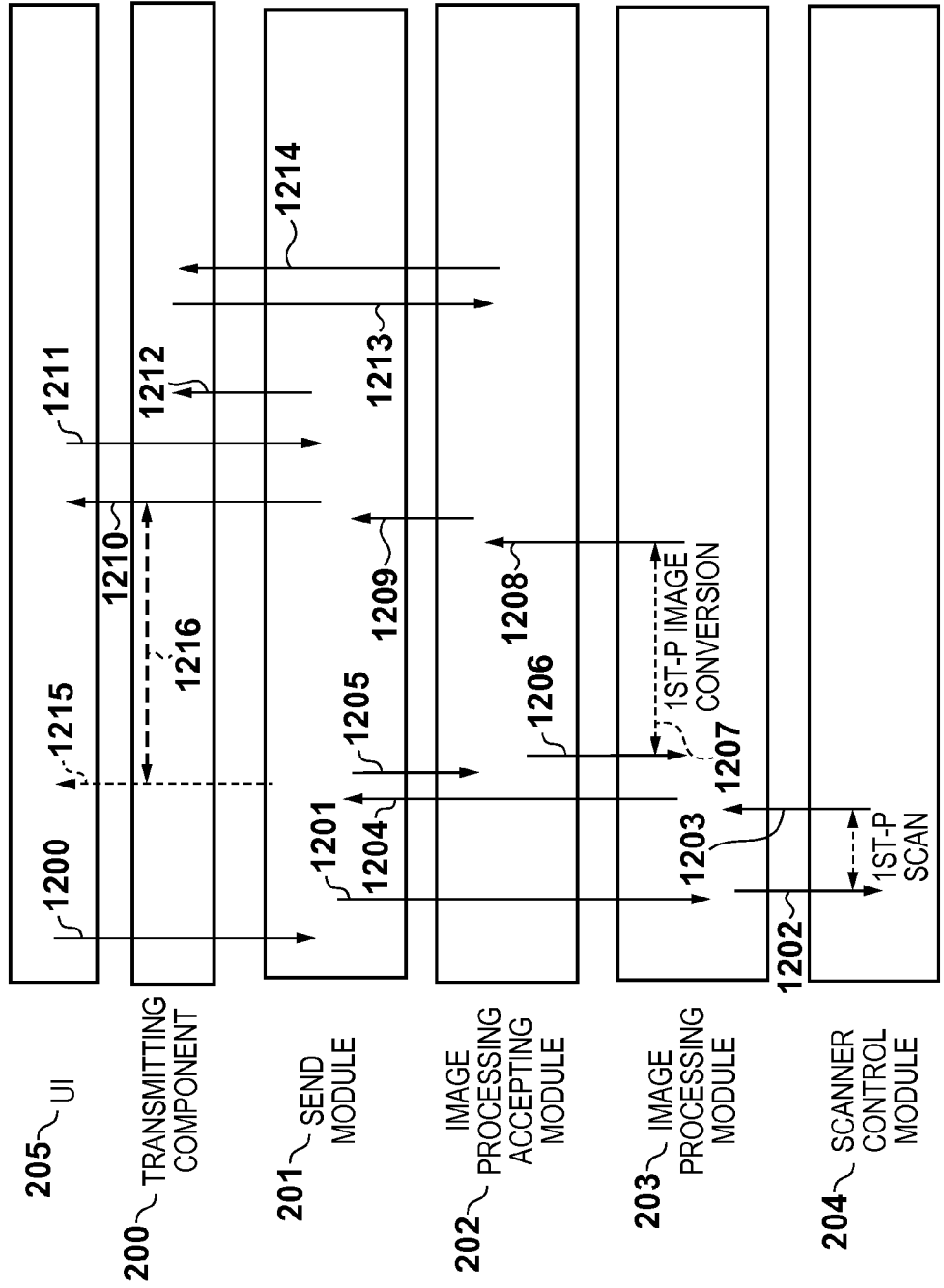
FIG. 11 is a command sequence chart at the time of a pressing plate reading operation according to the present invention.

A case will be described below with reference to FIG. 11 wherein the transmitting operation described using FIG. 3 is to be executed when a transmitting instruction designated with the pressing plate reading operation of an original to be read, which is set on the glass surface of the scanner 134, is issued.

A scan start command 1200 as a command used to read an image of an original placed on the pressing plate of the platen of the scanner 134 is supplied from the UI 205 to the SEND module 201. In response to this command 1200, the SEND module 201 issues a command to the scanner control module 204 as scan start commands 1201 and 1202. The scanner control module 204 controls the scanner 134 to read the original set on the platen.

Upon completion of reading of the first page, the SEND module 201 is informed of completion of the scan of the first page using commands 1203 and 1204. Upon completion of the scan of the first page, image conversion of the first page is executed using image conversion commands 1205 and 1206. Upon completion of the conversion, image conversion end commands 1208 and 1209 are issued. The SEND module 201 informs the UI 205 of completion of reading of one page using a command 1210. After that, a transmitting start command 1211 is issued, and the transmitting component 200 transmits image data of the first page via commands 1212 to 1214.

The UI 205 displays a selection screen which prompts the user to select whether to scan the next page by exchanging the original placed on the pressing plate or to start transmission. When the normal scan which does not execute image conversion is selected at the time of the scan, a timing at which the UI 205 is informed of the scan end corresponds to a timing 1215. Therefore, if the transmitting operation shown in FIG. 3 is executed when the pressing plate reading operation is designated, a long time 1216 is required from when the scan is complete until the next screen is displayed, thus posing a problem. This time changes depending on the contents of the image conversion processing, and 5 sec or longer are required to convert an image into a complicated file format (for example, a high resolution, large paper size, OCR processing, OOXML, etc.). In order to solve the above problem, if the pressing plate reading operation is designated, the process advances from step S1013 to the normal scan in step S1015.

<Transmitting Operation in Case of Continuous Reading Designation>

Figure 12:
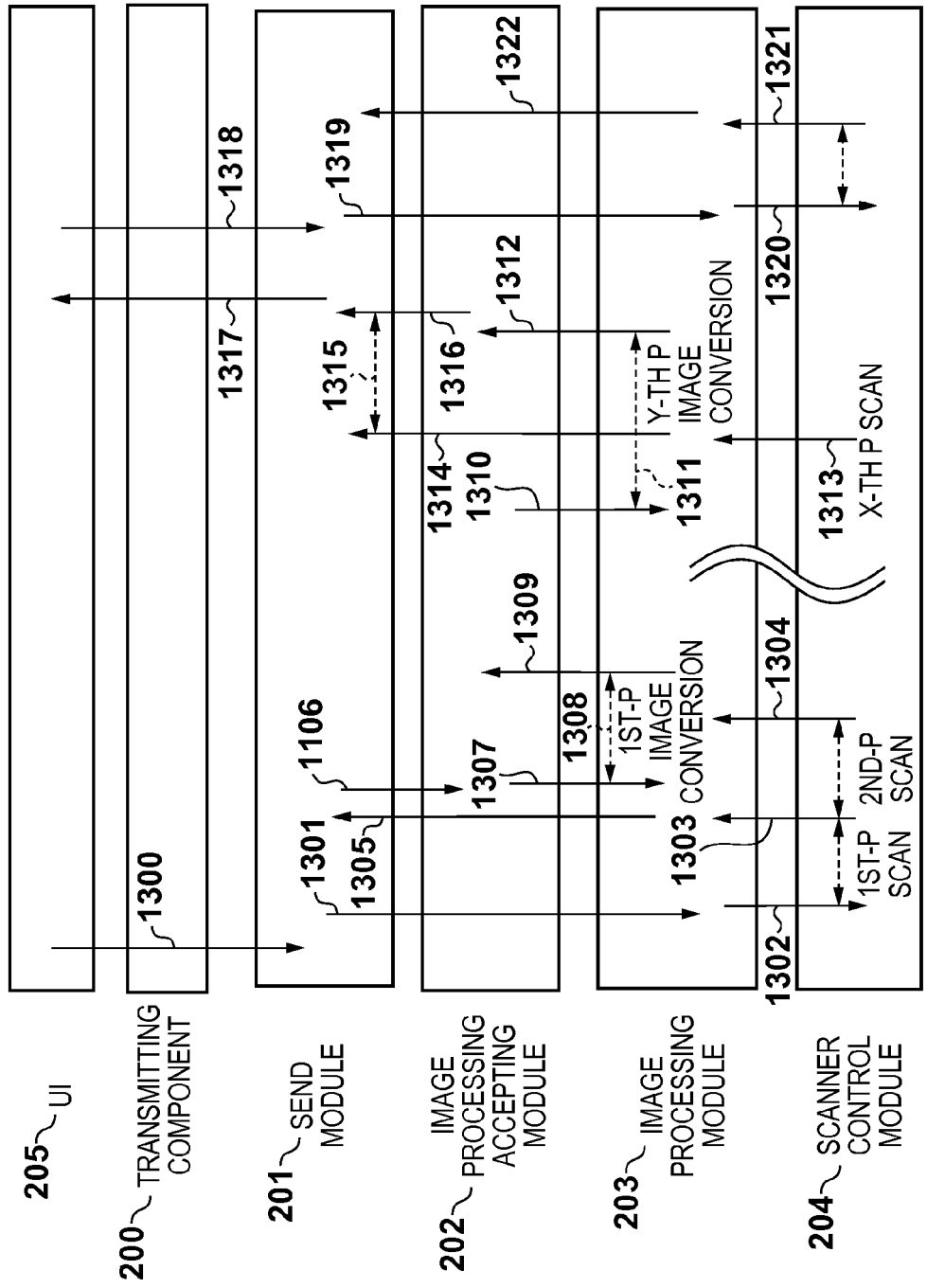
FIG. 12 is a command sequence chart at the time of a continuous reading operation according to the embodiment.
Figure 13:
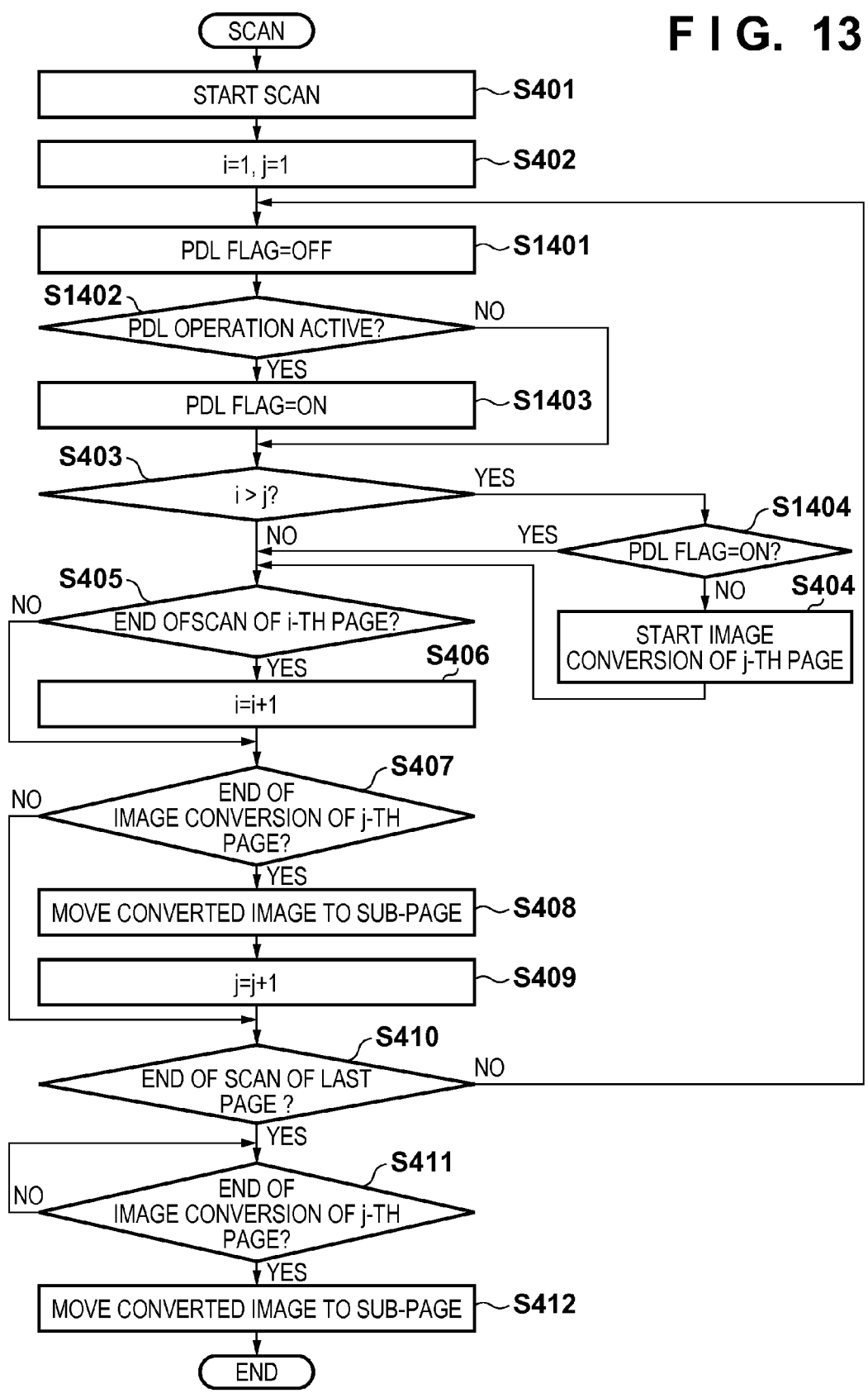
FIG. 13 is a flowchart for explaining the operation of a SEND module in a competing state of PDL and SEND functions according to another embodiment.

A case will be described below with reference to FIG. 12 wherein the transmitting operation described using FIG. 3 is to be executed when a transmitting instruction is issued while being designated with the continuous reading operation for repetitively scanning a plurality of original bundles for each original bundle, and transmitting scanned images as one file.

A transmitting start command 1300 designated with the continuous reading operation is supplied from the UI 205 to the SEND module 201, which issues scan start commands 1301 and 1302 to the scanner control module. The scanner control module 204 controls the scanner 134 to read an original set on the platen.

Upon completion of reading of each page, the SEND module 201 is informed of completion of reading of the page using commands 1303 and 1304. When the reading of the first page is complete, and the SEND module 201 is informed of that fact using a command 1305, image conversion commands 1306 and 1307 of the first page are issued. When the image conversion of the first page is complete after an elapse of a time 1308, the image processing module 203 notifies the image processing accepting module 202 of completion of the image conversion using a command 1309.

Such operation is continuously executed, and upon completion of the scan of an X-th page as the last page of the first bundle, the SEND module 201 is notified of completion of the scan of the last page as the X-th page using commands 1313 and 1314. During this interval, the image conversion is executed parallel to the scan operation. When an image conversion command 1310 of a Y-th page is input, the SEND module 201 is notified of completion of the conversion using commands 1312 and 1316.

The SEND module 201 informs the UI 205 of completion of the scan of the first bundle at this timing using a command 1317. After that, when the user sets the next original bundle on the feeder and presses the start key, a continuous scan command 1318 used to scan the original bundle is issued, and commands 1319 and 1320 are supplied, thereby scanning the first page of the second bundle. Upon completion of the scan operation, commands 1321 and 1322 are supplied to inform the SEND module 201 of that fact.

When the normal scan which does not execute image conversion at the time of the scan is executed, since the UI 205 is notified at a timing 1314, the notification is delayed by a time 1315, and a time during which a displayed message remains unchanged even after completion of the scan is generated. In order to avoid this problem, if the continuous reading designation is made in step S1014, the process advances to the normal scan in step S1015.

<Other Embodiments>
<Processing in Competing State of Plural Functions>

Other embodiments of the present invention will be described below with reference to FIGS. 13 to 17. The operation of a SEND module in a competing state of PDL and SEND functions will be described first with reference to FIG. 13. The processing to be described below is implemented when a CPU 130 reads out a control program stored in a ROM 131 onto a RAM 132 and executes the readout program. Since operations for a COPY function and SEND function are made using an operation unit 133, no competing operation is basically generated. However, a competing operation is generated between a PDL function used to print data generated by a PC at a place distant from an MFP 100 from an application and the SEND function used to read and transmit an image of an original. When the PDL function is activated, a use amount of the RAM 132 is increased. As a result, when the PDL and SEND function compete against each other, such competing state influences a scan speed, and the scan speed is not constant, resulting in a cluttering state. Since the user of the PDL function enters a JOB regardless of a person who operates the MFP 100 in front of it, if that person happens to use the SEND function, the scan speed is not constant. When the user sets a transmitting file format and makes a scan setting and transmit destination setting at the operation unit 133, and presses a start key, the following processing is started. Note that in the following description, the same step numbers denote the same processes as those in the flowchart shown in FIG. 4.

In step S401, the CPU 130 activates a scanner 134 to feed an original set on the feeder and to start an original reading operation. Subsequently, in step S402, the CPU 130 sets "1" in variables i and j as initial values. In step S1401, the CPU 130 initializes a PDL flag indicating the PDL function is enabled during a SEND scan to OFF. The CPU 130 determines in step S1402 whether or not the PDL function for receiving PDL data generated by a printer driver of a PC, rasterizing an image, and printing the rasterized image is active. If the PDL function is active, the process advances to step S1403, and the CPU 130 changes the PDL flag to ON; otherwise, the process jumps to step S403 without changing the flag.

The CPU 130 determines in step S403 if the variable i is larger than the variable j. If the variable i is larger than the variable j, the process advances to step S1404, and the CPU 130 determines whether or not the PDL flag is ON. If the PDL flag is not ON, the process advances to step S404, and the CPU 130 passes an image of a j-th page to an image processing accepting module 202, and controls an image processing module 203 to start conversion of the image. That is, if the PDL function is active, the CPU 130 judges that a competing operation is unwantedly generated, and postpones image data conversion processing.

The CPU 130 determines in step S405 whether or not the scan of the i-th page is complete. If the scan is complete, the process advances to step S406, and the CPU 130 increments the variable i by 1. The CPU 130 determines in step S407 whether or not the image conversion of the j-th page executed in step S404 is complete. If an image conversion result is received, and the image conversion is complete, the process advances to step S408, and the CPU 130 moves a converted image to a sub-page of the j-th page described using FIG. 4. Then, in step S409, the CPU 130 increments the variable j by 1.

The CPU 130 determines in step S410 whether or not a scan end command 219 is received. If a scan end command is not received, the process returns to step S1401; otherwise, the process advances to step S411, and the CPU 130 determines whether or not the image conversion of the j-th page is complete. If the image conversion is complete, the process advances to step S412, and the CPU 130 executes processing for moving a converted image to a sub-page, thus ending the processing.

<Re-transmitting Processing>

Processing for re-transmitting a document, in the middle of transmission of which an error has occurred due to occurrence of an abnormality of a network line caused by accidental power-OFF will be described below with reference to FIG. 14. As described above using FIG. 10, once the scan operation is executed, converted images of scanned document pages are recorded in sub-page of that document, and image processing data 206 is updated by image conversion.

For example, when image conversion for three pages is complete during the scan, and when an error has occurred during conversion of an image of the fourth page, information at the time of completion of the third page is stored in the image processing data 206. When re-transmission is executed, image conversion for the first and second pages is skipped since their converted images are registered in sub-pages. Upon generation of header information of the second page, header data of the second page is generated using an image of the second page and data of the image processing data 206. At this time, since the data of the image processing data 206 stores information at the time of completion of the third page, a mismatch occurs. When this data is sent to a PC, images cannot be displayed, and it is recognized that the data is broken. In order to solve this problem, when the re-transmitting processing is activated, the flowchart shown in FIG. 14 is executed. The processing to be described below is implemented when the CPU 130 reads out a control program stored in the ROM 131 onto the RAM 132 and executes the readout program.

In step S1501, the CPU 130 deletes sub-page data of all pages of document management. In step S1502, the CPU 130 executes image conversion. Since no image is registered in a sub-page, the conversion processing of an actual image by the image processing module 203 is activated. Although the transmitting speed becomes low due to the actual image processing, data of the image processing data 206 is rewritten by data of the first page, and assumes a normal value. Hence, transmitting processing is executed in step S1503. After that, the CPU 130 determines in step S1504 whether or not the converted and transmitted page is the last page. If that page is not the last page, the next page to be processed is selected in step S1505, and the process returns to step S1502. On the other hand, if all pages have been processed, the processing ends.

<Measure Against Long Scan Time>

A measure required to suppress a problem that a scan time seems long when an image conversion time of the first page is long at the time of scanning two pages of originals will be described below with reference to FIGS. 15 and 16. A problem will be described first with reference to FIG. 15.

When the UI 205 issues a scan start command 1600, the SEND module 201 supplies a command 1601 to the image processing module 203, which supplies a command 1602 to the scanner control module 204. The scanner control module 204 feeds an original on the feeder, and issues a scan end command 1603 upon completion of a scan of the first page and a scan end command 1604 upon completion of a scan of the second page.

The image processing module 203 issues a command 1605 upon completion of the scan of the first page. The SEND module 201, which is notified of completion of the scan of the first page, instructs execution of image conversion of the first page using a command 1606, and the image processing module 203 converts an image in response to a command 1607. Upon completion of the scan of the second page, the image processing module 203 returns a command 1608 to the SEND module 201.

In this case, the SEND module 201 wants to return a scan end command to the UI 205 at a timing of a command 1609, but it cannot return the command since the image conversion of the first page is not complete yet. Upon reception of the scan end command 1609, the UI 205 permits the user to enter the next JOB, changes red indication of the start key to blue indication, and clears a hatched display that inhibits a screen operation, thus allowing an operation. When the user makes a quick operation, the next JOB has to be executed before completion of image conversion of the first page, and two JOBs have to be executed and managed concurrently, thus requiring complicated processing. In order to return the scan end command to the UI 205 at the timing of the command 1609, the SEND module 201 has to issue a transmitting start command to the transmitting component 200 before it returns that command.

When a transmitting command is issued to the transmitting component 200 before completion of the image conversion of the first page, the transmitting component 200 executes an image conversion request for the first page, the image conversion of which is not complete yet and is in progress, resulting in complicated processing. For this reason, after image conversion end commands 1610 and 1611 of the first page is received, a transmitting start command 1612 is issued, and a scan end command 1613 is then issued to the UI 205.

As a result, the hatched display on the operation unit 133 is not cleared for a time 1614 since completion of reading of the scanner 134, and the operator consequently feels as if the scanner reading time were prolonged. After that, when the transmitting component 200 issues an image conversion command 1614 of the first page to the image processing accepting module 202, since the already converted image is registered in a sub-page of the document management, image processing accepting module 202 returns this image using a command 1615. The transmitting component 200 issues an image conversion command 1616 of the second page while transmitting the received converted image. Since conversion of the second page is not executed yet, the image processing accepting module 202 confirms if an image is not registered in a sub-page, and then issues an image conversion command 1617 to the image processing module 203. Upon completion of the image conversion of the second page, the converted image is returned to the transmitting component 200 using commands 1618 and 1619. After the transmitting component 200 transmits the image of the second page, it informs the UI 205 of completion of transmission using a command 1620.

The measure against the problem described with reference to FIG. 15 will be described below with reference to FIG. 16. Since the commands 1601 to 1608 are the same as those in FIG. 15, a description thereof will not be repeated.

At the timing of the command 1609, the SEND module 201 returns a scan end command to the UI 205. Upon reception of the scan end command 1609, the UI 205 permits the user to enter the next JOB, changes red indication of the start key to blue indication, and clears a hatched display that inhibits a screen operation, thus allowing an operation. The user sets an original to be transmitted on the feeder, quickly sets data such as a transmit destination, and issues a next JOB 1700 to the SEND module 201 at a timing before completion of image processing of the first page. Since the image conversion of the first page of the previous JOB is not complete yet, the SEND module 201 sets the current job in an execution reserved state. Upon completion of the image conversion of the first page, the SEND module 201 is informed of that fact using commands 1610 and 1611. After that, the SEND module 201 issues a transmitting start command 1612 to the transmitting component 200, and the transmitting processing is executed using the commands 1614 to 1620 described in FIG. 15 (not shown).

Figure 15:
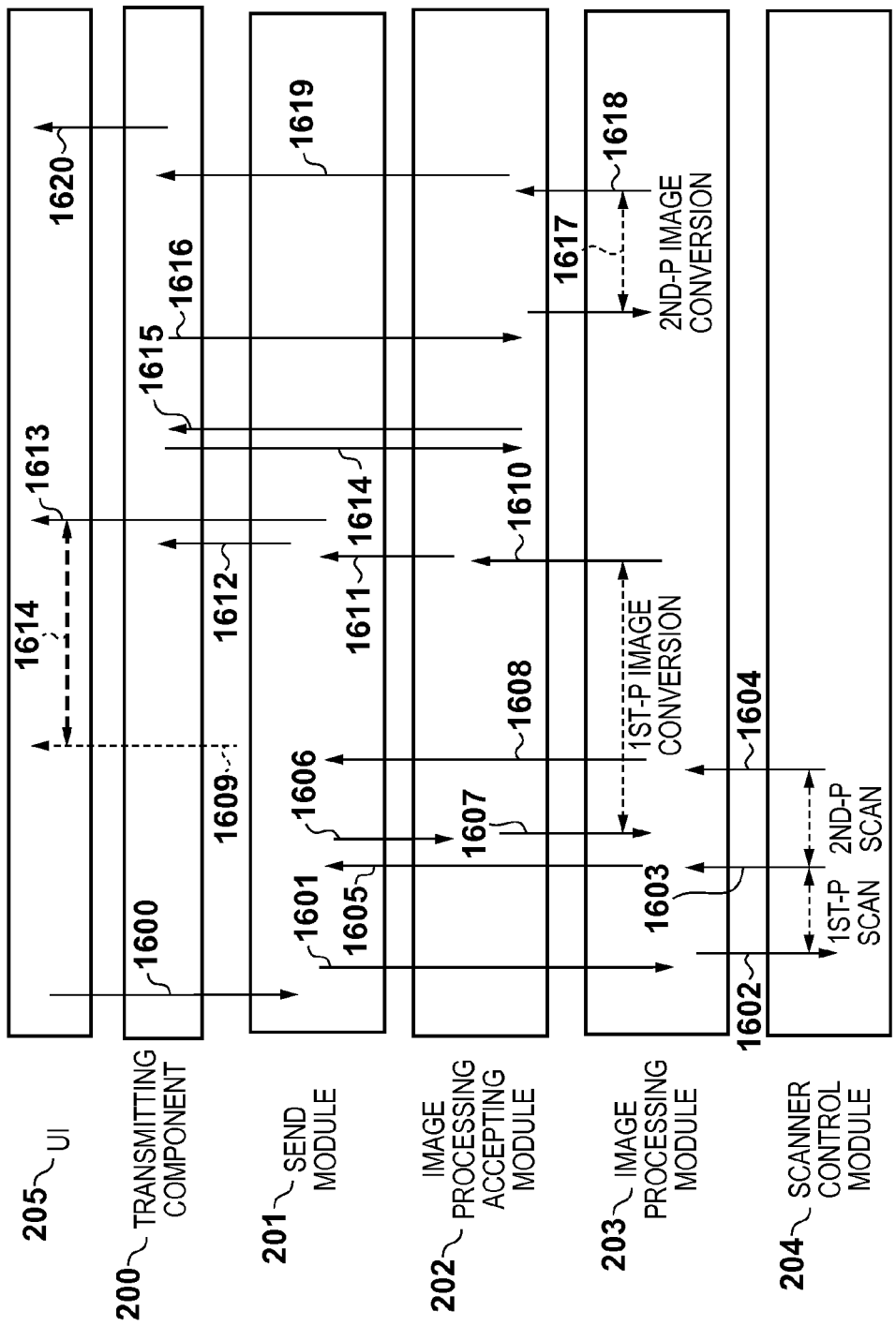
FIG. 15 is a chart for explaining a problem that a scan time seems long according to another embodiment.
Figure 16:
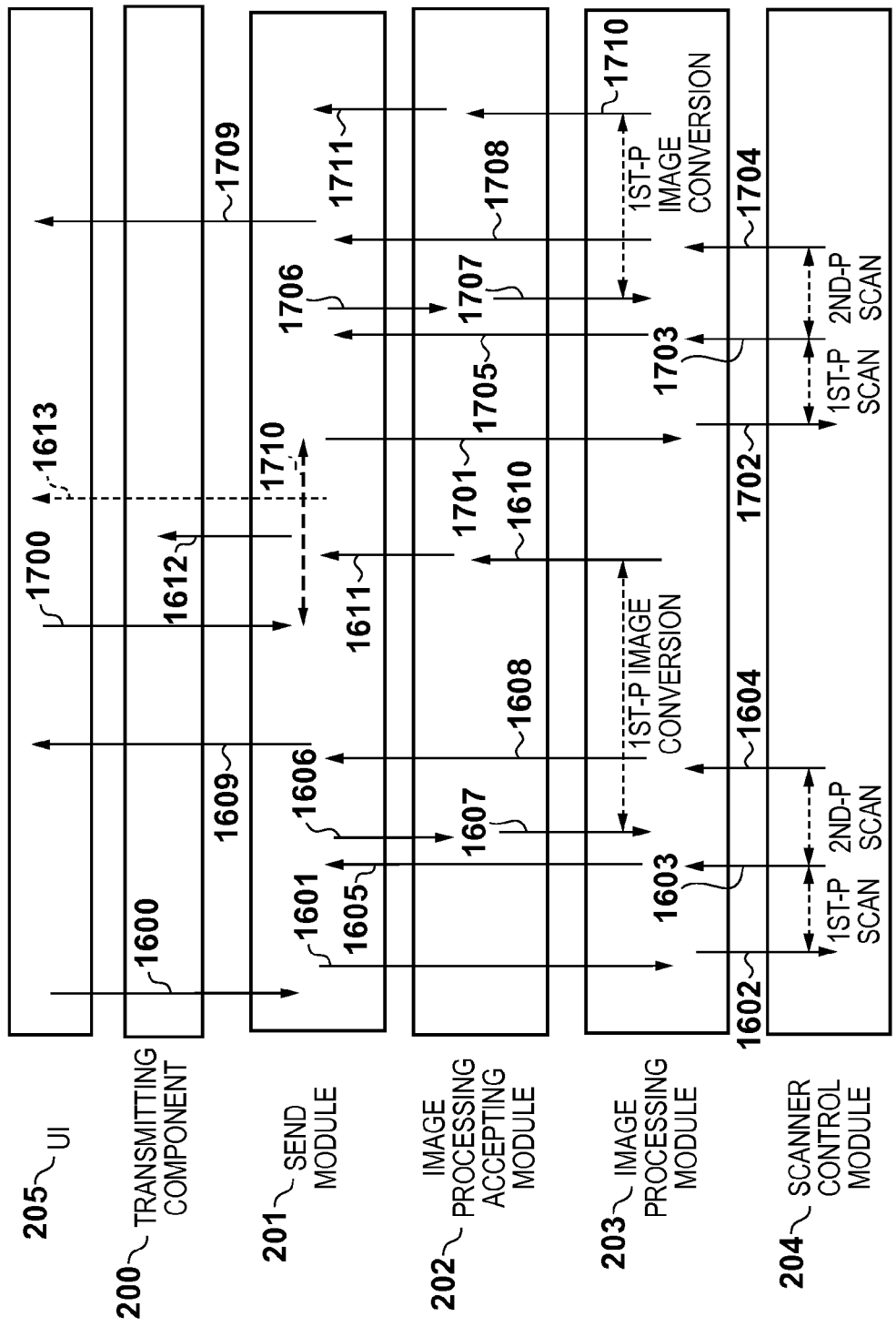
FIG. 16 is a chart for explaining the command sequences used to explain a JOB execution reservation function according to another embodiment.

The scan end command 1613 issued in FIG. 15 is not issued since it has already been issued as the command 1609. After completion of the image conversion of the first page and an elapse of a time 1710 until completion of the JOB which was input first, the SEND module 201 issues a scan start command 1701 of the next JOB. This command is supplied to the scanner control module 204 as a command 1702. The scanner control module 204 feeds an original on the feeder, and issues a scan end command 1703 upon completion of a scan of the first page and a scan end command 1704 upon completion of a scan of the second page.

Upon completion of the scan of the first page, the image processing module 203 issues a command 1705. The SEND module 201, which is informed of completion of the scan of the first page, instructs image conversion of the first page using a command 1706, and the image processing module 203 converts an image in response to a command 1707. Upon completion of the scan of the second page, the image processing module 203 returns a command 1708 to the SEND module 201. The SEND module 201 returns a scan end command to the UI 205 at a timing of a command 1709. Upon reception of the scan end command 1709, the UI 205 permits the user to enter the next JOB, changes red indication of the start key to blue indication, and clears a hatched display that inhibits a screen operation, thus allowing an operation.

As described above, the second scan JOB is consequently set in the execution reserved state for the time 1710. When the JOB is in the execution reserved state, the UI 205 displays a message "scan reserved". When the user presses a reset key as a hardware key, the execution-reserved JOB is discarded. Not many users set an original to be transmitted on the feeder, quickly set data such as a transmit destination, and execute a next scan JOB before completion of image processing of the first page. However, by changing the start key to blue indication and clearing the hatched display at the completion timing of the scan operation of the scanner, feeling of a slow reading operation of the scanner can be reduced. Even when the user presses the start key at an early timing, a JOB is set in the execution reserved state, and the reading operation is automatically started, thus minimizing a trouble in terms of operation.

<JOB Execution Reservation Processing>

Figure 17:
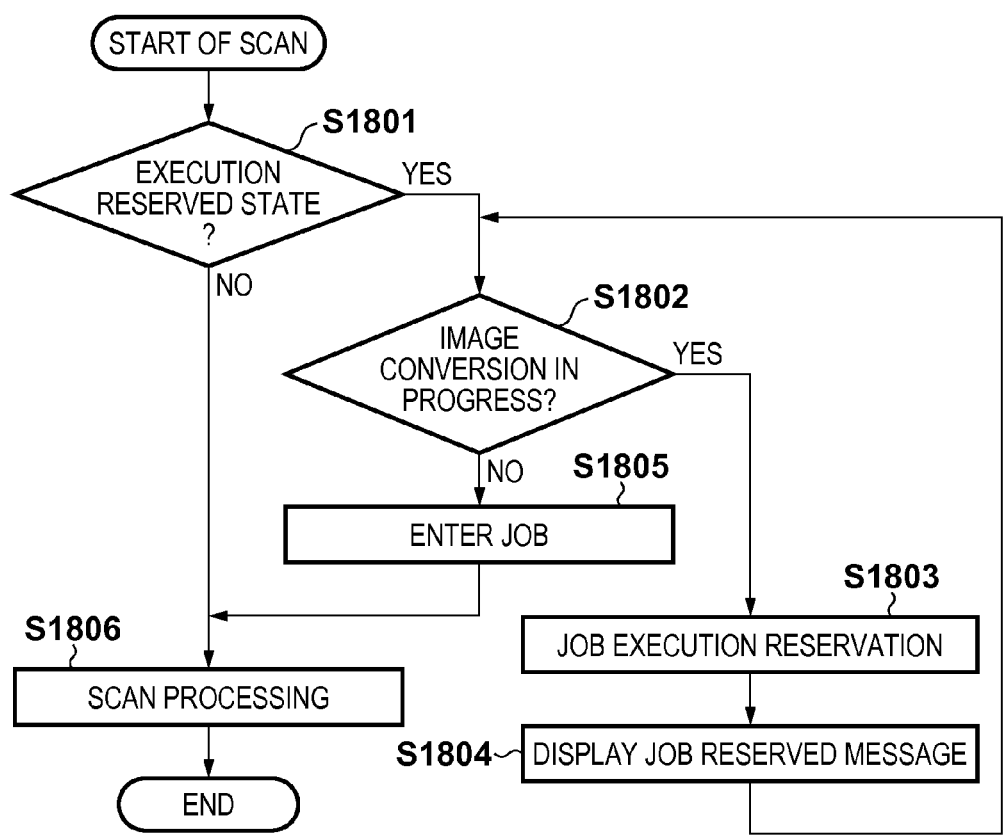
FIG. 17 is a flowchart for explaining the JOB execution reservation function according to another embodiment.

The JOB execution reservation function, which has been described using FIGS. 15 and 16 and runs in the SEND module 201, will be described below with reference to FIG. 17. The processing to be described below is implemented when the CPU 130 reads out a control program stored in the ROM 131 onto the RAM 132 and executes the readout program. The following scan start flowchart is started when the UI 205 notifies a scan start command 1600.

The CPU 130 determines in step S1801 whether or not the state of the SEND module 201 has been transited to the JOB execution reserved state. If the state of the SEND module 201 is not the JOB execution reserved state, the process advances to step S1806 to activate scan processing. This processing includes the processes executed by the SEND module 201 using the commands 1601 to 1609. Upon completion of the scan processing in step S1806, the UI 205 changes red indication of the start key to blue indication, and clears a hatched display that inhibits a screen operation, thus allowing an operation. When the user sets an original on the feeder, quickly sets data such as a transmit destination, and presses the start key, the processing of this flowchart is started again.

On the other hand, if the CPU 130 determines in step S1801 that the state of the SEND module 201 is the JOB execution reserved state, the process advances to step S1802. The CPU 130 determines in step S1802 whether or not image conversion is in progress. If the image conversion is in progress, the CPU 130 changes state transition to the JOB execution reserved state in step S1803, and displays a JOB reserved message in step S1804. Then, the process returns to step S1802. If the image conversion is complete in step S1802, the CPU 130 executes JOB entry processing in step S1805, thus executing the scan processing in step S1806.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048609 filed on Mar. 5, 2012, and No. 2012-271781 filed on Dec. 12, 2012, which are hereby incorporated by reference herein in their entirety.

What is claimed is:

1. An image processing apparatus comprising:
a reading unit configured to read images from originals including a plurality of pages, and to output image data in turn from a read page;
a conversion unit configured to convert the image data of the page output from said reading unit into a predetermined transmitting format;
a transmitting unit configured to transmit the image data converted by said conversion unit; and
a control unit configured to control said conversion unit to convert the image data into the predetermined transmitting format in turn from the read page until said reading unit has read images from all pages of the originals, to control said transmitting unit to transmit image data of a first page in a case where the image data of the first page has already been converted into the predetermined transmitting format by said conversion unit after said reading unit has read all the pages of the originals, and to control said conversion unit to convert image data of a second page into the transmitting format in a case where the image data of the second page has not been converted into the predetermined transmitting format yet after said reading unit has read all the pages of the originals and then to control said transmitting unit to transmit the image data of the second page.

2. The apparatus according to claim 1, further comprising a document management unit configured to manage image data read by said reading unit and image data converted by said conversion unit in association with each other,
wherein said control unit judges a page as the image data of the first page has already been converted in a case where the image data of the first page converted by said conversion unit is managed by said document management unit that, and judges a page as the image data of the second page has not been converted yet in a case where the image data of the second page is not managed by said document management unit.

3. The apparatus according to claim 1, wherein when said control unit accepts a conversion request of image data and said conversion unit is converting another image data, said control unit adds the accepted conversion request to a queue.

4. The apparatus according to claim 1, further comprising a determination unit configured to determine whether or not a job is executed in a first mode in which image data is converted into the predetermined transmitting format after said reading unit reads images from all pages of originals or in a second mode in which image data is converted into the predetermined transmitting format and is transmitted in turn from the first page already read before said reading unit reads images from all pages of originals,
wherein when said determination unit determines that the job is executed in the second mode, said control unit controls said conversion unit to convert image data into the predetermined transmitting format in turn from the first page already read until said reading unit has read images from all pages of originals, controls said transmitting unit to transmit image data of the first page in a case where the image data of the first page has already been converted into the transmitting format by said conversion unit after said reading unit has read all the pages of the originals, and controls said conversion unit to convert image data of a second page into the transmitting format in a case where the image data of the second page has not been converted into the transmitting format by said conversion unit yet after said reading unit has read all the pages of the originals and then controls said transmitting unit to transmit the image data of the second page.

5. The apparatus according to claim 4, wherein when said determination unit determines that the job is executed in the first mode, said control unit controls said conversion unit to convert image data into the transmitting format and controls said transmitting unit to transmit the image data after said reading unit has read images from all the pages of the originals.

6. The apparatus according to claim 4, wherein said determination unit determines that the job is executed in the first mode when a transmit destination in an accepted job is a FAX destination, an IFAX destination, or a BOX destination, when a resolution of image data to be transmitted is not less than a predetermined value, when a reading size by said reading unit is a long size or a free size, when a preview mode for displaying an image on an operation unit before transmission is designated, when a pressing plate reading mode for reading an original placed on a pressing plate is designated, when a continuous reading mode for separately reading images of a plurality of bundles of originals, and transmitting the read images as one file is designated, or when a PDL function for executing printing using externally input image data is running.

7. The apparatus according to claim 1, wherein when said control unit controls said conversion unit to convert image data, and when a PDL function for executing printing using externally input image data is running, said control unit controls said conversion unit to wait for conversion of image data.

8. The apparatus according to claim 1, wherein when said control unit executes re-transmitting processing of image data, said control unit deletes image data which has already been obtained by image conversion, and then controls to transmit image data of all pages while converting the image data.

9. The apparatus according to claim 1, wherein when reading operations of all pages of originals by said reading unit in a current job are complete, even when transmitting processing by said transmitting unit is not complete yet, said control unit allows to enter a next job, when the next job is entered, said control unit sets the next job in a reserved state until processing of the current job is completed, and when the current job is complete, said control unit controls said reading unit to start reading operations of the next job.

10. The apparatus according to claim 1, further comprising:
a designating unit configured to designate the predetermined transmitting format,
wherein the conversion unit convert the image data of the page into the predetermined transmitting format designated by the designating unit.

11. The apparatus according to claim 10, wherein the designating unit designates the predetermined transmitting format from among TIFF format, JPEG format, and PDF format.

12. The apparatus according to claim 1, wherein the predetermined transmitting format is JPEG format.

13. The apparatus according to claim 1, wherein the transmission unit transmits the image data using an e-mail.

14. A control method of an image processing apparatus, which comprises
a reading unit configured to read images from originals including a plurality of pages, and to output image data in turn from a read page,
a conversion unit configured to convert the image data of the page output from the reading unit into a predetermined transmitting format, and a transmitting unit configured to transmit the image data converted by the conversion unit, the method comprising:

controlling the conversion unit to convert the image data into the predetermined transmitting format in turn from the read page until the reading unit has read images from all pages of the originals, controlling the transmitting unit to transmit image data of a first page, in a case where the image data of the first page has already been converted into the transmitting format by the conversion unit after said reading unit has read all the pages of the originals, and controlling the conversion unit to convert image data of a second page into the transmitting format in a case where the image data of the second page has not been converted into the transmitting format yet after said reading unit has read all the pages of the originals and then controlling the transmitting unit to transmit the image data of the second page.

15. A computer-readable storage medium storing a computer program for controlling a computer to execute respective steps in a control method of an image processing apparatus of claim 14.

16. An image processing apparatus comprising:

a reading unit configured to read images from originals including a plurality of pages, and to output image data in turn from a read page;

a conversion unit configured to convert the image data of the page output from said reading unit into a predetermined transmitting format;

a transmitting unit configured to transmit the image data converted by said conversion unit;

a determining unit configured to determine, in a response to transmission of image data of a first page, whether image data of a second page has been already converted into the predetermined transmitting format; and a control unit configured to control said transmitting unit to transmit image data of the second page in a case where the determining unit determines that the image data of the second page has been already converted, and to control said conversion unit to convert image data of the second page into the predetermined transmitting format in a case where the determining unit determines that the image data of the second page has not been converted yet, and then to control said transmitting unit to transmit the image data of the second page.

17. An image processing apparatus comprising:

a reading unit configured to read images from originals including a plurality of pages, and to output image data in turn from a read page;

a conversion unit configured to convert the image data of the page output from said reading unit into a predetermined transmitting format;

a transmitting unit configured to transmit the image data converted by said conversion unit; and a control unit configured to control, in a response to transmission of image data of a predetermined page, said transmitting unit to transmit image data of a next page of the predetermined page in a case where the image data of the next page of the predetermined page has been already converted, and to control, in a response to completion of transmission of image data of the predetermined page, said conversion unit to convert image data of the next page of the predetermined page into the predetermined transmitting format in a case where the image data of the next page of the predetermined page has been not converted yet, and then to control said transmitting unit to transmit the image data of the next page of the predetermined page.

18. The apparatus according to claim 17, further comprising:

a designating unit configured to designate the predetermined transmitting format, wherein the conversion unit converts the image data of the page into the predetermined transmitting format designated by the designating unit.

19. The apparatus according to claim 18, wherein the designating unit designates the predetermined transmitting format from among TIFF format, JPEG format, and PDF format.

20. The apparatus according to claim 17, wherein the predetermined transmitting format is JPEG format.

21. The apparatus according to claim 17, wherein the transmission unit transmits the image data using an e-mail.

* * * * *